United States Patent
Bjornson et al.

(10) Patent No.: US 8,025,341 B2
(45) Date of Patent: Sep. 27, 2011

(54) MOBILE OIL SANDS MINING SYSTEM

(75) Inventors: Bradford E. Bjornson, Lethbridge (CA); Mario Decrescentis, Fort McMurray (CA); John Steven Little, Fort McMurray (CA); Paul Frederick MacDougall, Fort McMurray (CA)

(73) Assignee: Suncor Energy Inc., Calgary, Alberta (CA)

( * ) Notice: Subject to any disclaimer, the term of this patent is extended or adjusted under 35 U.S.C. 154(b) by 0 days.

(21) Appl. No.: 11/558,340

(22) Filed: Nov. 9, 2006

(65) Prior Publication Data

US 2007/0180741 A1  Aug. 9, 2007

(30) Foreign Application Priority Data

Nov. 9, 2005 (CA) ..................................... 2526336

(51) Int. Cl.
*B03B 9/02* (2006.01)
(52) U.S. Cl. .......................................... 299/18; 299/1.9
(58) Field of Classification Search .................. 198/301, 198/571, 594; 299/7, 1.9, 18, 64
See application file for complete search history.

(56) References Cited

U.S. PATENT DOCUMENTS

| 2,910,424 A | 10/1959 | Tek et al. ......................... 208/11 |
| 3,358,855 A | 12/1967 | Carlton et al. |
| 3,402,896 A | 9/1968 | Daman |
| 3,419,145 A | 12/1968 | Celis .............................. 210/84 |
| 3,607,720 A | 9/1971 | Paulson ........................... 208/11 |
| 3,808,120 A | 4/1974 | Smith .............................. 208/11 |

(Continued)

FOREIGN PATENT DOCUMENTS

CA 970308 7/1975

(Continued)

OTHER PUBLICATIONS

Protest to CA 2,358,805 Application.

(Continued)

*Primary Examiner* — John Kreck
(74) *Attorney, Agent, or Firm* — Knobbe, Martens, Olson & Bear, LLP

(57) ABSTRACT

A process line for excavating and processing oil sands ore near a mine face. A mobile excavator excavates ore along the length of a mobile mining conveyor. A mobile comminutor receives and comminutes the excavated ore and transfers the comminuted ore to the mobile mining conveyor. The mobile mining conveyor conveys the comminuted ore to a transfer conveyor that conveys the comminuted ore to a mobile slurry facility. The mobile slurry facility combines the comminuted ore with process water to produce a slurry and pumps and conditions the slurry through a hydro-transport pipeline to a mobile extraction facility as a slurry feed. The mobile extraction facility receives the slurry feed and directs the slurry feed and a water stream as inputs to a three stage countercurrent cyclone separator. The cyclone separator produces a bitumen rich stream and a tailings stream. The bitumen rich stream is directed to a froth concentration unit that separates the bitumen rich stream into a bitumen product stream, a recycled water stream and a fine tailings stream. The fine tailings stream is combined with the tailings stream to produce a tailings product stream that is directed to a tailings treatment facility. The tailings treatment facility receives the tailings product and combines the tailings product with an additive to produce a treated tailings stream that is directed to a tailings pond for separation into a dry tails phase and a water phase that may be collected and recycled as industrial process water.

23 Claims, 23 Drawing Sheets

U.S. PATENT DOCUMENTS

| | | | |
|---|---|---|---|
| 3,956,417 A | 5/1976 | Franz et al. | 260/683.6 |
| 3,962,070 A | 6/1976 | Stotler | 208/10 |
| 3,971,718 A | 7/1976 | Reid | 210/84 |
| 3,972,861 A | 8/1976 | Gardner, Jr. et al. | 260/123.5 |
| 4,017,263 A | 4/1977 | Holmes et al. | 23/288 |
| 4,035,282 A | 7/1977 | Stuchberry et al. | 208/11 |
| 4,036,664 A | 7/1977 | Priebe | 127/69 |
| 4,072,609 A | 2/1978 | Kizior | 210/73 |
| 4,090,943 A | 5/1978 | Moll et al. | 208/10 |
| 4,103,972 A | 8/1978 | Kochanowsky | |
| 4,139,646 A | 2/1979 | Gastrock | 426/430 |
| 4,146,534 A | 3/1979 | Armstrong | 260/123.5 |
| 4,206,840 A | 6/1980 | Hanson | |
| 4,212,353 A | 7/1980 | Hall | |
| 4,216,796 A | 8/1980 | Gastrock | 137/571 |
| 4,279,743 A | 7/1981 | Miller | 209/211 |
| 4,337,143 A | 6/1982 | Hanson et al. | 208/11 |
| 4,383,914 A | 5/1983 | Kizior | 208/177 |
| 4,397,741 A | 8/1983 | Miller | 209/170 |
| 4,399,027 A | 8/1983 | Miller | 209/164 |
| 4,489,818 A | 12/1984 | Franke et al. | |
| 4,505,516 A | 3/1985 | Shelton | |
| 4,505,811 A * | 3/1985 | Griffiths et al. | 209/13 |
| 4,512,956 A | 4/1985 | Robinson et al. | |
| 4,514,305 A | 4/1985 | Filby | 210/703 |
| 4,519,899 A | 5/1985 | Oertle et al. | |
| 4,545,892 A | 10/1985 | Cymbalisty et al. | 208/11 |
| 4,556,422 A | 12/1985 | Reynolds et al. | 75/101 |
| 4,581,142 A | 4/1986 | Fladby et al. | 210/512.1 |
| 4,585,180 A | 4/1986 | Potts | 241/186 |
| 4,604,988 A | 8/1986 | Rao | 126/360 |
| 4,733,828 A | 3/1988 | Potts | 241/236 |
| 4,744,890 A | 5/1988 | Miller et al. | 209/164 |
| 4,763,845 A | 8/1988 | Guggenheimer et al. | 241/101.71 |
| 4,781,331 A | 11/1988 | Potts | 241/236 |
| 4,799,627 A | 1/1989 | Potts | 241/236 |
| 4,838,434 A | 6/1989 | Miller et al. | 209/164 |
| 4,851,123 A | 7/1989 | Mishra | 210/609 |
| 4,859,317 A | 8/1989 | Shelfantook et al. | |
| 4,914,017 A | 4/1990 | Mifune | 430/604 |
| 4,994,097 A | 2/1991 | Brouwers | 55/317 |
| 5,032,275 A | 7/1991 | Thew | 210/512.1 |
| 5,035,910 A | 7/1991 | Jones | 426/478 |
| 5,037,558 A | 8/1991 | Kalnins | 210/702 |
| 5,055,202 A | 10/1991 | Carroll et al. | 210/739 |
| 5,062,955 A | 11/1991 | Sciamanna | 210/512.1 |
| 5,066,407 A | 11/1991 | Furlow | 210/744 |
| 5,071,556 A | 12/1991 | Kalnins et al. | 210/512.1 |
| 5,071,557 A | 12/1991 | Schubert et al. | 210/512.2 |
| 5,073,177 A | 12/1991 | Brouwers | 55/317 |
| 5,090,498 A | 2/1992 | Hamill | 175/206 |
| 5,110,471 A | 5/1992 | Kalnins | 210/512.2 |
| 5,118,408 A | 6/1992 | Jansen et al. | 209/164 |
| 5,143,598 A | 9/1992 | Graham et al. | 208/390 |
| 5,161,744 A | 11/1992 | Maurer et al. | |
| 5,207,805 A | 5/1993 | Kalen et al. | 55/1 |
| 5,223,148 A | 6/1993 | Tipman et al. | 210/744 |
| 5,234,094 A | 8/1993 | Weyermann et al. | 198/303 |
| 5,242,580 A | 9/1993 | Sury | 208/400 |
| 5,242,604 A | 9/1993 | Young et al. | 210/768 |
| 5,264,118 A | 11/1993 | Cymerman et al. | 208/390 |
| 5,302,294 A | 4/1994 | Schubert et al. | 210/702 |
| 5,316,664 A | 5/1994 | Gregoli et al. | |
| 5,340,467 A | 8/1994 | Gregoli et al. | 208/390 |
| 5,350,525 A | 9/1994 | Shaw et al. | 210/744 |
| 5,377,810 A | 1/1995 | Lehtonen et al. | 198/303 |
| 5,441,206 A | 8/1995 | Schade et al. | 241/81 |
| 5,458,770 A | 10/1995 | Fentz | 210/168 |
| 5,480,566 A | 1/1996 | Strand | |
| 5,538,631 A | 7/1996 | Yeh | 210/221.2 |
| 5,556,545 A | 9/1996 | Volchek et al. | 210/651 |
| 5,620,594 A | 4/1997 | Smith et al. | 210/167 |
| 5,667,543 A | 9/1997 | Brouwers | 55/317 |
| 5,667,686 A | 9/1997 | Schubert | 210/512.1 |
| 5,711,374 A | 1/1998 | Kjos | 166/265 |
| 5,723,042 A | 3/1998 | Strand et al. | |
| 5,740,834 A | 4/1998 | Sherowski | 137/527.6 |
| 5,766,484 A | 6/1998 | Petit et al. | 210/703 |
| 5,772,127 A | 6/1998 | Maciejewski et al. | |
| 5,840,198 A | 11/1998 | Clarke | 210/802 |
| 5,879,541 A | 3/1999 | Parkinson | 208/425 |
| 5,954,277 A | 9/1999 | Cymerman et al. | |
| 5,958,256 A | 9/1999 | Ocel, Jr. et al. | 210/800 |
| 5,996,690 A | 12/1999 | Shaw et al. | 166/250 |
| 6,074,549 A | 6/2000 | Bacon Cochrane et al. | |
| 6,077,433 A | 6/2000 | Henriksen et al. | 210/634 |
| 6,119,870 A | 9/2000 | Maciejewski et al. | 209/725 |
| 6,155,400 A | 12/2000 | Daigh et al. | 198/301 |
| 6,189,613 B1 | 2/2001 | Chachula et al. | 166/265 |
| 6,197,095 B1 | 3/2001 | Ditria et al. | 95/248 |
| 6,213,208 B1 | 4/2001 | Skilbeck | 166/264 |
| 6,283,277 B1 | 9/2001 | Smith et al. | |
| 6,322,327 B1 | 11/2001 | Dawson et al. | |
| 6,322,845 B1 | 11/2001 | Dunlow | 426/629 |
| 6,336,684 B1 * | 1/2002 | Turner | 299/1.9 |
| 6,346,069 B1 | 2/2002 | Collier | 494/3 |
| 6,378,608 B1 | 4/2002 | Nilsen et al. | 166/265 |
| 6,398,973 B1 | 6/2002 | Saunders | 210/788 |
| 6,450,775 B1 | 9/2002 | Hutchinson et al. | |
| 6,468,330 B1 | 10/2002 | Irving et al. | 95/219 |
| 6,527,960 B1 | 3/2003 | Bacon et al. | |
| 6,543,537 B1 | 4/2003 | Kjos | 166/266 |
| 6,596,170 B2 | 7/2003 | Tuszko et al. | 210/512.1 |
| 6,607,437 B2 | 8/2003 | Casey et al. | 463/16 |
| 6,702,877 B1 | 3/2004 | Swanborn | 95/269 |
| 6,719,681 B2 | 4/2004 | Collier | 494/37 |
| 6,730,236 B2 | 5/2004 | Kouba | 210/806 |
| 6,800,116 B2 | 10/2004 | Stevens et al. | 95/262 |
| 6,800,208 B2 | 10/2004 | Bolman | 210/788 |
| 6,821,060 B2 | 11/2004 | McTurnk et al. | |
| 7,011,219 B2 | 3/2006 | Knox-Holmes et al. | 209/725 |
| 7,013,937 B2 | 3/2006 | Potts | 141/387 |
| 7,060,017 B2 | 6/2006 | Collier | 494/3 |
| 2001/0001434 A1 * | 5/2001 | Daigh et al. | 198/301 |
| 2001/0005986 A1 | 7/2001 | Matsubara et al. | 55/459.1 |
| 2001/0042713 A1 | 11/2001 | Conrad et al. | 210/512.1 |
| 2002/0018842 A1 | 2/2002 | Dunlow | 426/630 |
| 2002/0068673 A1 | 6/2002 | Collier | 494/5 |
| 2002/0068676 A1 | 6/2002 | Collier | 494/37 |
| 2002/0148777 A1 | 10/2002 | Tuszko | 210/512.1 |
| 2003/0085185 A1 | 5/2003 | Kouba | 210/787 |
| 2003/0168391 A1 | 9/2003 | Tveiten | 210/188 |
| 2004/0055972 A1 | 3/2004 | Garner et al. | 210/787 |
| 2004/0069705 A1 | 4/2004 | Tuszko et al. | 210/512.1 |
| 2004/0094456 A1 | 5/2004 | Dries | 208/113 |
| 2004/0140099 A1 | 7/2004 | Hauge et al. | 166/357 |
| 2004/0182754 A1 | 9/2004 | Lange | 209/115 |
| 2004/0192533 A1 | 9/2004 | Collier | 494/74 |
| 2004/0251731 A1 * | 12/2004 | Potts | 299/18 |
| 2004/0262980 A1 * | 12/2004 | Watson | 299/8 |
| 2005/0016904 A1 | 1/2005 | Knox-Holmes et al. | 209/590 |
| 2005/0134102 A1 * | 6/2005 | Cymerman et al. | 299/7 |
| 2005/0173726 A1 | 8/2005 | Potts | 257/134 |
| 2005/0183930 A1 * | 8/2005 | Bernard et al. | 198/508 |
| 2006/0091249 A1 | 5/2006 | Potts | 241/236 |
| 2006/0112724 A1 | 6/2006 | Chang et al. | 62/470 |
| 2006/0122449 A1 | 6/2006 | van Egmond | 585/809 |
| 2006/0138036 A1 | 6/2006 | Garner et al. | 210/202 |
| 2006/0138055 A1 | 6/2006 | Garner et al. | 210/703 |

FOREIGN PATENT DOCUMENTS

| | | |
|---|---|---|
| CA | 1026252 | 2/1978 |
| CA | 1059052 | 7/1979 |
| CA | 1066644 | 11/1979 |
| CA | 1068633 C | 12/1979 |
| CA | 1072473 | 2/1980 |
| CA | 1153347 | 11/1980 |
| CA | 1163257 | 11/1980 |
| CA | 1097574 | 3/1981 |
| CA | 1103184 C | 6/1981 |
| CA | 1126187 | 6/1982 |
| CA | 1193586 | 12/1982 |
| CA | 1138822 | 4/1983 |
| CA | 1231692 | 1/1984 |
| CA | 1194622 | 1/1985 |

| | | |
|---|---|---|
| CA | 1266261 | 2/1986 |
| CA | 1201412 | 3/1986 |
| CA | 1254171 | 5/1989 |
| CA | 1256045 | 6/1989 |
| CA | 1256045 C | 6/1989 |
| CA | 1267860 C | 4/1990 |
| CA | 1269945 C | 6/1990 |
| CA | 1277941 C | 12/1990 |
| CA | 2037856 | 9/1991 |
| CA | 1293465 | 12/1991 |
| CA | 2029756 | 5/1992 |
| CA | 1305390 | 7/1992 |
| CA | 2058221 | 7/1992 |
| CA | 2060780 C | 8/1992 |
| CA | 1309050 C | 10/1992 |
| CA | 1318273 | 5/1993 |
| CA | 1322177 | 9/1993 |
| CA | 1325180 | 12/1993 |
| CA | 2108521 | 4/1994 |
| CA | 2086073 | 6/1994 |
| CA | 2155198 | 8/1994 |
| CA | 2000984 C | 11/1994 |
| CA | 2092121 A1 | 12/1994 |
| CA | 2184613 | 11/1995 |
| CA | 2029795 C | 11/1996 |
| CA | 2180686 | 2/1997 |
| CA | 2231543 | 3/1997 |
| CA | 2263691 | 3/1998 |
| CA | 2222667 A1 | 5/1998 |
| CA | 2088227 C | 2/1999 |
| CA | 2249679 C | 4/1999 |
| CA | 2308410 | 5/1999 |
| CA | 2236183 | 10/1999 |
| CA | 2325596 A1 | 10/1999 |
| CA | 518320 | 11/1999 |
| CA | 2195604 C | 11/1999 |
| CA | 2294860 | 12/1999 |
| CA | 2246841 C | 3/2000 |
| CA | 2365008 | 8/2000 |
| CA | 2358805 A1 | 1/2001 |
| CA | 2298122 | 7/2001 |
| CA | 2090618 | 10/2001 |
| CA | 2332207 A1 | 10/2001 |
| CA | 2311738 | 11/2001 |
| CA | 2409129 | 11/2001 |
| CA | 2315596 A1 | 2/2002 |
| CA | 857306 | 3/2002 |
| CA | 873854 | 3/2002 |
| CA | 882667 | 3/2002 |
| CA | 910271 | 3/2002 |
| CA | 2431648 A1 | 6/2002 |
| CA | 2217300 | 8/2002 |
| CA | 2259245 C | 10/2002 |
| CA | 2227667 C | 11/2002 |
| CA | 2358805 C | 2/2003 |
| CA | 2518040 | 3/2003 |
| CA | 2235938 C | 4/2003 |
| CA | 2498862 A1 | 7/2003 |
| CA | 2419325 | 8/2003 |
| CA | 2440312 | 9/2003 |
| CA | 2522514 | 4/2004 |
| CA | 2469326 | 5/2004 |
| CA | 2476194 | 7/2004 |
| CA | 2548370 | 11/2004 |
| CA | 2548371 | 11/2004 |
| CA | 2435113 | 1/2005 |
| CA | 2436158 | 1/2005 |
| CA | 2558059 | 1/2005 |
| CA | 2439436 | 3/2005 |
| CA | 2499840 | 3/2005 |
| CA | 2499846 | 3/2005 |
| CA | 2532737 | 3/2005 |
| CA | 2535702 | 3/2005 |
| CA | 2537603 | 3/2005 |
| CA | 2483896 | 4/2005 |
| CA | 2440311 | 5/2005 |
| CA | 2453697 A1 | 6/2005 |
| CA | 2493677 | 6/2005 |
| CA | 2549895 | 6/2005 |
| CA | 2554725 | 6/2005 |
| CA | 2454942 | 7/2005 |
| CA | 2455623 | 7/2005 |
| CA | 2462359 | 9/2005 |
| CA | 2520821 | 9/2005 |
| CA | 2558424 | 10/2005 |
| CA | 2467372 | 11/2005 |
| CA | 2565980 | 12/2005 |
| CA | 2510099 | 1/2006 |
| CA | 2517811 | 2/2006 |
| CA | 2538464 | 2/2006 |
| CA | 2563922 | 3/2006 |
| CA | 2520943 | 4/2006 |
| CA | 2522031 | 4/2006 |
| CA | 2580836 | 4/2006 |
| CA | 2582078 | 4/2006 |
| CA | 2506398 | 5/2006 |
| CA | 2587866 | 6/2006 |
| CA | 2494391 | 7/2006 |
| CA | 2217623 C | 8/2007 |
| CA | 2246841 | 8/2008 |
| CN | 1112033 | 11/1995 |
| CN | 2263552 Y | 10/1997 |
| CN | 2520942 Y | 11/2002 |
| CN | 1701856 | 11/2005 |
| DE | 28 34 987 | 2/1980 |
| DE | 39 36 681 | 5/1990 |
| EP | 262916 | 6/1988 |
| EP | 355127 | 6/1989 |
| EP | 0 167 178 | 4/1990 |
| EP | 332641 | 3/1994 |
| EP | 605746 | 7/1994 |
| EP | 1600215 | 11/2005 |
| EP | 1501636 | 8/2006 |
| GB | 195055 | 1/1924 |
| GB | 726841 | 3/1955 |
| GB | 814610 | 6/1959 |
| GB | 1090689 | 11/1967 |
| GB | 1302064 | 1/1973 |
| GB | 2047735 | 1/1980 |
| GB | 2075543 | 11/1981 |
| GB | 2116447 | 9/1983 |
| GB | 0401933-1 | 1/2005 |
| GB | 0406802-9 | 1/2005 |
| JP | 61082856 | 4/1986 |
| WO | WO 83/00318 | 2/1983 |
| WO | WO 83/02071 | 6/1983 |
| WO | WO 83/03062 | 9/1983 |
| WO | WO 83/03444 | 10/1983 |
| WO | WO 94/23823 | 10/1994 |
| WO | WO 98/58739 | 12/1998 |
| WO | WO 99/54049 | 10/1999 |
| WO | WO 00/10896 | 3/2000 |
| WO | WO 00/35585 | 6/2000 |
| WO | WO 00/74815 | 12/2000 |
| WO | WO 02/092231 A1 | 11/2002 |
| WO | WO 03/006165 | 1/2003 |
| WO | WO 03/068407 | 8/2003 |
| WO | WO 03/074394 | 9/2003 |
| WO | WO 03/092901 | 11/2003 |
| WO | WO 2004/005673 | 1/2004 |
| WO | WO 2004/060819 | 7/2004 |
| WO | WO 2004/094061 | 11/2004 |
| WO | WO 2005/000454 | 1/2005 |
| WO | WO 2005/044871 | 5/2005 |
| WO | WO 2005/046874 | 5/2005 |
| WO | WO 2005/046875 | 5/2005 |
| WO | WO 2005/072877 | 8/2005 |
| WO | WO 2006/035209 | 4/2006 |
| WO | WO 2006/085759 | 8/2006 |

OTHER PUBLICATIONS

"Oil Sands, Our Petroleum Future" Conference held at Edmonton Convention Centre, Edmonton, Alberta, Canada, Apr. 4-7, 1993.

Rimmer, D.P.; "Hydrocyclone-based Process for Rejecting solids from Oil Sands at the Mine Site While Retaining Bitumen for Transportation to a Processing Plant", seminar entitled Oil Sands—Our Petroleum Future, Apr. 5, 1993, Alberta, Canada.

Jon Harding, "Cost-Saving Moves into High Gear" article in *Financial Post*, Apr. 4, 2006.
"Review of Oil Sands Technology" *Canada's Oil Sands: A Supply and Market Outlook to 2015*, National Energy Board, Chapter 4, pp. 22-24, Oct. 2000.
Excerpts from "Information Package for Mobile Crushing Plants (MCP)" Krupp Canada.
Jonah, Ken; "Syncrude's Mine Production Planning", *Mine Planning and Equipment*, Singhal (ed.), pp. 443-456, 1988 Balkema, Rotterdam.
Doucet et al., "Drilling and Blasting in Tarsand", Suncor Oil Sands Group, Nov. 7-8, 1985.
De Malherbe, et al. "Synthetic Crude from Oil Sands", VDI-Verlag GmbH, Dusseldorf 1983, vol. 3, No. 8, pp. 20-21.
Coward, Julian, seminar material used as class handout, University of Alberta, Mar. 20, 2000.
Office Action dated Aug. 28, 2008 for U.S. Appl. No. 11/558,303—Restriction Requirement.
Office Action dated Nov. 12, 2008 for U.S. Appl. No. 11/558,303.
Restriction Requirement dated Aug. 25, 2009 for U.S. Appl. No. 11/938,189.
Notice of Allowance dated Sep. 14, 2009 for U.S. Appl. No. 11/558,303.
Excerpts from "Information Package for Mobile Crushing Plants (MCP)", Krupp Canada, Calgary, Alberta, Canada, 2003 or earlier, 46 pages.
Office Action dated Mar 17, 2010 for U.S. Appl. No. 11/938,189.
Office Action dated Nov. 9, 2010 for U.S. Appl. No. 11/938,189.
Office Action dated Feb. 4, 2011 for U.S. Appl. No. 11/938,189.
Office Action dated Jul. 2, 2010 for U.S. Appl. No. 12/242,642.
Office Action dated Dec. 14, 2010 for U.S. Appl. No. 12/242,642.
Restriction Requirement dated Feb. 8, 2011 for U.S. Appl. No. 11/938,175.
Restriction Requirement dated Dec. 12, 2008 for U.S. Appl. No. 11/595,817.
Office Action dated Mar. 2, 2009 for U.S. Appl. No. 11/595,817.
Office Action dated Jul. 21, 2009 for U.S. Appl. No. 11/595,817.
Office Action dated Jan. 21, 2010 for U.S. Appl. No. 11/595,817.
Office Action dated for Aug. 6, 2010 U.S. Appl. No. 11/595,817.
Office Action dated Mar. 17, 2011 for U.S. Appl. No. 11/595,817.
Restriction Requirement dated Feb. 24, 2011 for U.S. Appl. No. 11/938,226.
Natural Resources Canada, Treatment of Bitumen Froth and Slop Oil Tailings, Dec. 2001.
Krebs' Engineers, Krebs D-Series gMAX DeSanders for Oil and Gas, Bulletin 11-203WEL, 4 pages.
Eva Mondt "Compact Centrifugal Separator of Dispersed Phases" Proefschrift © 2005 by Eva Mondt, 152 pages.
Definition of "lateral", Merriam-Webster Online Dictionary, Accessed Mar. 10, 2011, pp. 1-3.

* cited by examiner

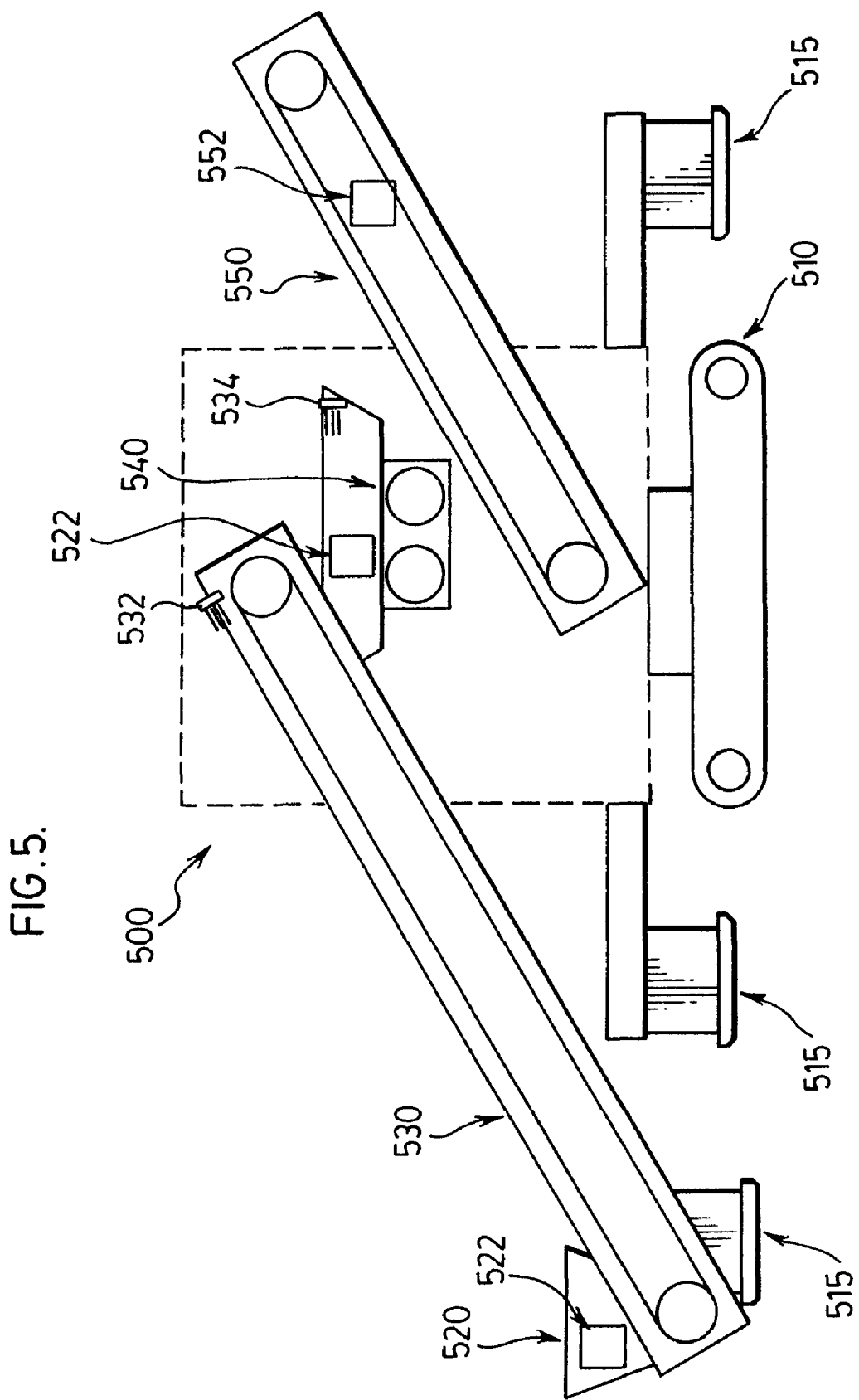

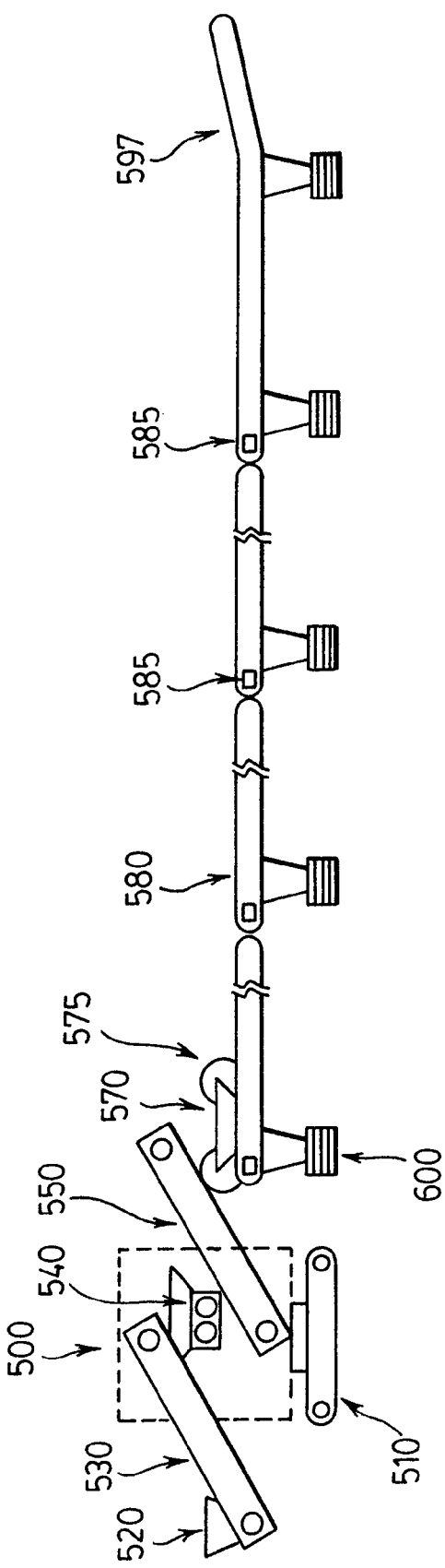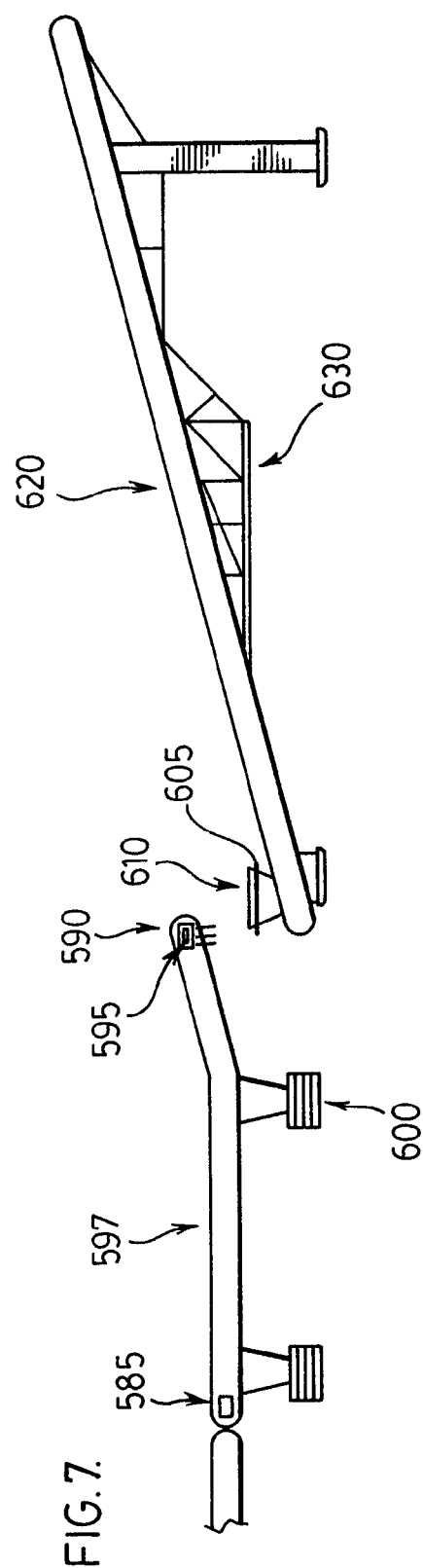

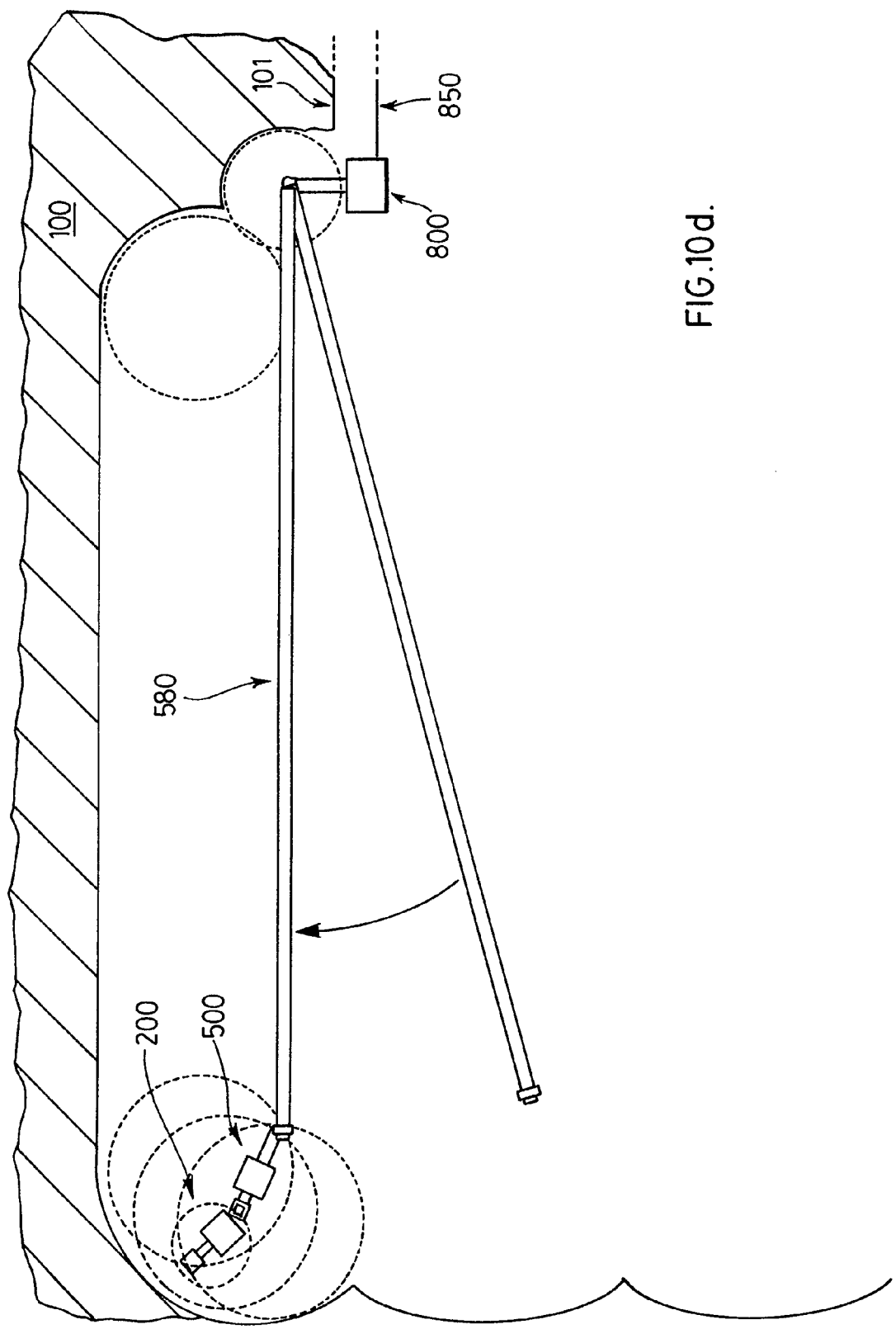

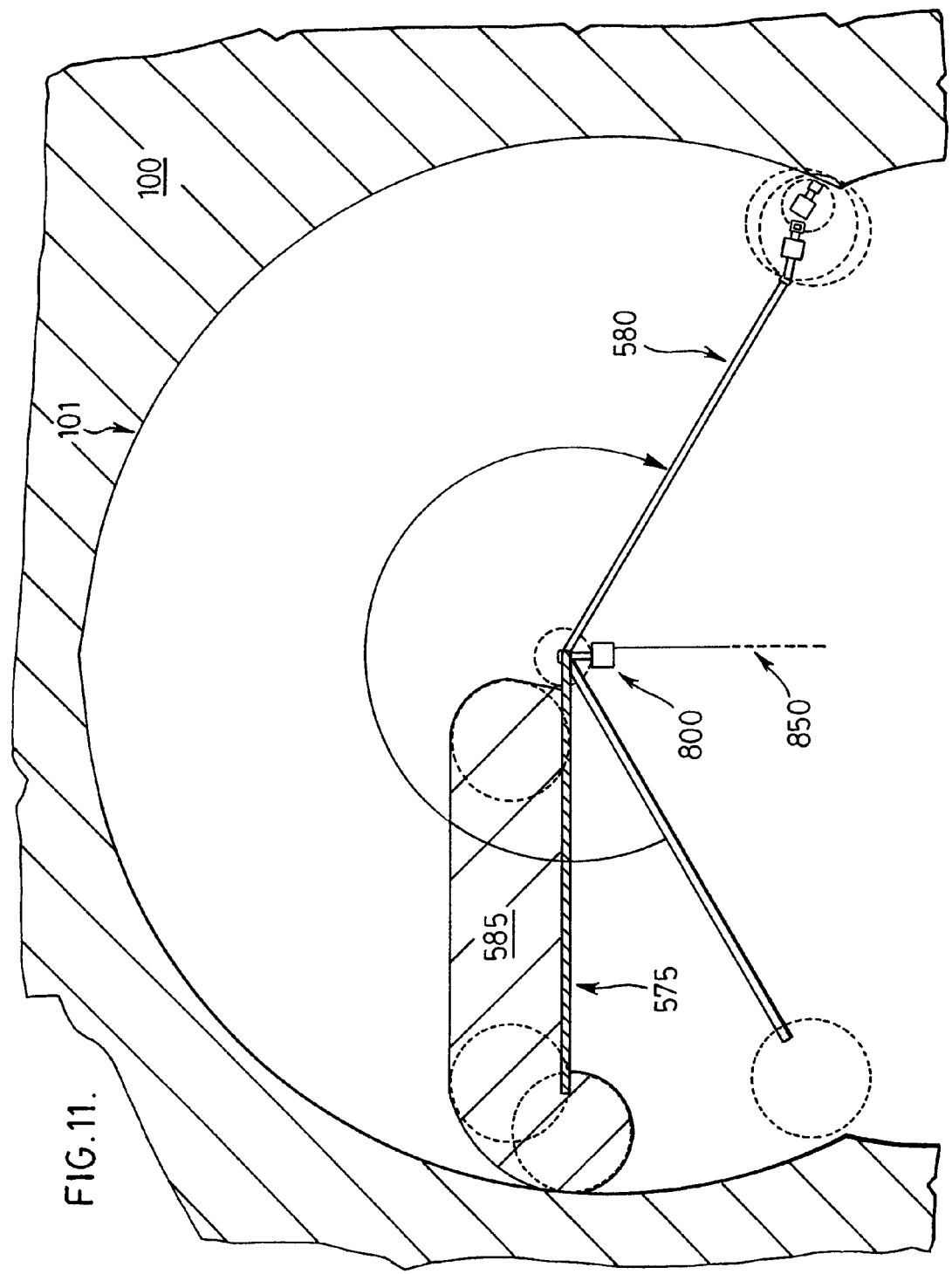

MOBILE OIL SANDS MINING SYSTEM

REFERENCE TO PRIOR APPLICATIONS

This application claims priority from Canadian Application No. 2,526,336, filed Nov. 9, 2005.

FIELD OF THE INVENTION

This invention relates to mining technology and a method for the processing of recovered bitumen bearing oil sands from the earth. More particularly, the invention relates to a mobile system of equipment for increasing the efficiency of the ore mining operation.

BACKGROUND OF THE INVENTION

The Northern Alberta Tar Sands are considered to be one of the world's largest remaining oil reserves. The tar sands are typically composed of about 70 to about 90 percent by weight mineral solids, including sand and clay, about 1 to about 10 percent by weight water, and a bitumen or oil film, that comprises from trace amounts up to as much as 21 percent by weight. Typically ores containing a lower percentage by weight of bitumen contain a higher percentage by weight of fine mineral solids ("fines") such as clay and silt.

Unlike conventional oil deposits, the bitumen is extremely viscous and difficult to separate from the water and mineral mixture in which it is found. Generally speaking, the process of separating bitumen from the tar sands comprises six broad stages. 1) Initially, the oil sand is excavated from its location and passed through a crusher or comminutor to comminute the chunks of ore into smaller pieces. 2) The comminuted ore is then typically combined with hot process water to aid in liberating the oil. The combined tar sand and hot water is typically referred to as a "slurry". Other agents, such as flotation aids may be added to the slurry. 3) The slurry is then passed through a "conditioning" phase in which the slurry is allowed to mix and dwell for a period to create froth in the mixture. The term "conditioning" generally refers to a state whereby the slurry is sufficiently mixed and aerated that a commercially viable amount of the bitumen has left the mineral component to form an oily film over the bubbles in the slurry. 4) Once the slurry has been conditioned, it is typically passed through a series of separators for removing the bitumen froth from the slurry. 5) After the slurry has been sufficiently processed to remove the maximum practical amount of bitumen, the remaining material, commonly known as the "tails", is typically routed into a tailing pond for separation of the sand and fines from the water. Due to the time required to clarify the tailings water, the process requires the continual addition of fresh water. 6) The separated bitumen and water is then delivered to a secondary extraction process that further removes mineral and water content and provides a diluted bitumen product for delivery to an upgrader that converts the bitumen into a commercially usable product.

It has been recognized for a long time that, since the bitumen comprises a relatively small percentage by weight of the ore initially extracted, separation of the mineral content from the ore as soon as possible after excavation would lead to the most efficient and cost effective mining process. It has also been recognized that it would be useful to immediately recycle the process water used to create the slurry rather than the current requirement of continually using fresh water due to the slow process of clarifying tailings water. While these advantages have been known, to date there has been no commercially viable method of extracting the mineral content soon after excavation and recycling the process water. Generally, the sand and fines settle out of the tails at different rates with the fines taking a long time to settle out. This results in a tailings pond comprised of a sand deposit, a suspension of fines and water, and a thin layer of clarified water on the top of the tailings pond. While the thin layer of clarified water is clean enough that it may be siphoned off and recycled as process water, the bulk of the water remains trapped in the suspension. Furthermore, as settling progresses, the settled fines trap a significant percentage by weight of water. The net result has been extensive tailings ponds that require significant containment structures and associated ongoing maintenance as well as increasing transportation costs as the tails must be transported to new tailings deposition sites as existing ponds are filled. Handling the tails and transporting them to available tailings ponds has become a difficult and expensive logistical problem in mining the oil sands. Additionally, a large volume of water is tied up in existing ponds, necessitating a large ongoing demand for fresh process water.

Over the years, a variety of methods have been used to process and transport the sand from the excavation site. Initially, oil sand excavation and transport were completely mechanical via conveyor belts extending from the mine face to a large facility for processing the mined ore. As mining progressed the conveyors lengths were increased to transport ore from the receding mine face to a large processing facility. The use of conveyors led to many difficulties including high energy costs and mechanical breakdown which led to work stoppage. As mining continued, the use of conveyors to transport the ore over extended distances became unworkable.

Large ore trucks were instituted to replace the conveyor system for transporting ore from the mine face to the processing facility. The ore trucks, however, are expensive to purchase and operate and often create inefficiencies in the production process.

As described in Canadian Patent No. 2,029,795, it was determined that it was preferable to deliver the ore by truck from the mine face to an intermediate site where the ore would be crushed and combined with hot process water at a slurry preparation facility to create a pumpable slurry for transport through a pipe. This "hydro-transport" process served the dual purpose of efficiently transporting the slurry from an intermediate site relatively near the mine face to the large processing facility and allowing time for the slurry to be sufficiently conditioned on route. Provided the hydro-transport was over a sufficiently large enough distance that the dwell time in the pipe was sufficiently long, typically at least 1 kilometre, the slurry would arrive at the processing facility already conditioned and ready for separation. Thus, the previously required separate conditioning step could be omitted from the process.

While the hydro-transport solved some of the difficulties with transporting the ore from the mine site face to the separation facility, it did not solve the long term need to reduce the mechanical transport of large volumes of mined oilsand from the mine face to the intermediate site. As will be appreciated, continual excavation results in the active mine site face being located further and further from the crusher and slurry preparation facility. Solutions to date have typically relied on constructing longer conveyor belts to transport the ore, or use additional trucks, to move the ore from the mine face to the slurry facility at the intermediate site. Though these solutions provide temporary relief, they do not solve the inefficiency of transporting the mineral component further than required.

One concept was to do away with the transport step completely by locating all of the ore processing machinery near the mine face. An example of this concept is disclosed in Canadian Patent No. 2,092,121 and Canadian Patent No. 2,332,207. These references disclose a single mobile excavator and bitumen extraction facility, commonly referred to as a tar sand combine, that follows the mine face as digging progresses. This solution is not ideal as it requires the continuous transport of a large amount of extremely heavy machinery and water including a slurry preparation facility. In addition, connections to the hydro-transport pipeline and process water supply line must be continuously extended as the combine advances. Further, some embodiments suggest separating the mineral component at the mine face. Since the slurry must first be conditioned prior to separation, these embodiments require the continual transport of large volumes of slurry as it is conditioned.

In Canadian Patent Application No. 2,453,697, the idea of a process line comprising a combination of mobile and relocatable equipment units at the face of an oil sand mine site is suggested. The '697 application proposes a process comprising a mobile excavator that advances along a mine face, a mobile comminutor that advances behind the excavator to crush the mined ore to a conveyable size, and a relocatable conveyor that extends along the mine face for receiving the crushed oil sand and conveying it to a relocatable slurry facility for preparing slurry for hydro-transport. The slurry facility may be connected directly to a fixed pipe for hydro-transport. The process line of the '697 application allows for relatively small components, such as the excavator and comminutor, to be mobile and follow the mine face as digging progresses. Less transportable equipment such as the slurry facility and hydro-transport pipe, are relocatable. That is, they are stationed in a fixed location for an extended period of time (months), but may be relocated once the excavator has removed all of the ore within near proximity to the relocatable conveyor.

The disclosure of the '697 application suffers from several limitations. First, the dwell time of the slurry facility is determined solely by the rate of excavation and the length of the first relocatable conveyor. Thus, to increase the dwell time in a particular location, either the rate of excavation must be slowed or the length of the conveyor must be increased. The Northern Alberta region has extremely harsh weather conditions and it has been found that extensive conveyors consume a considerable amount of energy, and are prone to break down resulting in work stoppage. For this reason, the length of the conveyor is preferably not overly long. However, it is also desirable that the slurry facility be relocated as seldom as possible necessitating a minimum length of conveyor in order to access a suitable volume of ore to supply the slurry facility. An additional limitation of the '697 application is that a practical relocatable slurry facility or relocatable desanding facility is not disclosed.

A further problem faced by the industry is the extensive use of water to extract the bitumen from the ore. While the sand portion of the mineral component may be practically removed from the slurry, the fine tailings, clay and other fine-sized material, is difficult to remove from the tailings and tends to remain in suspension. The solution to date has been to store the tailings in ponds for a sufficient period to allow the fines to settle out of the water. It has been determined, however, that it takes an extremely long period of time for the fines to settle out, resulting in ever increasing tailings ponds. Additionally, water becomes trapped in the interstitial spacing between particles so that even after the fines have settled a large amount of water is trapped in the settled material. Other than the excessive water requirements, tailings ponds create an environmental and logistical challenge as tailings must be continually disposed of in the continuously growing volume of tailings ponds which must be contained and maintained for years. There thus exists a need for a method of processing oil sands that obviates the need for extensive tailings ponds and provides for the recycling of water from the tails soon after deposition at a deposition site.

A further limitation of the prior art is that there is no practical solution provided for handling tailings. Rather, current deposition methods result in a separation of a course tails and a fine tails, maintaining the need for extensive tailings ponds to provide settlement of the fine tailings component. There thus exists a need for a method of processing oil sands that produces a whole dry tails comprising both the sand component and the fine tailings.

There thus exists a need to increase the efficiency of excavation and transport processes to reduce operating costs. There exists an additional need to increase the operating period for an excavator servicing a transportable slurry facility, without increasing the distance of ore transport from the excavator to the facility. There exists a further need for a process capable of removing the mineral component of the oil sands at a proximate location to the mine face without the creation of extensive tailings ponds.

BRIEF DESCRIPTION OF THE DRAWINGS

In drawings which illustrate by way of example only a preferred embodiment of the invention.

FIG. 5 is a side view illustration of an embodiment of the present invention.

FIG. 6 is a side view illustration of an embodiment of the present invention.

FIG. 7 is a side view illustration of an embodiment of the present invention.

FIGS. 10*a*-*f* are top view illustrations of an embodiment of the present invention.

FIG. 11 is a top view illustration of an embodiment of the present invention.

DETAILED DESCRIPTION OF THE INVENTION

Figure 1:
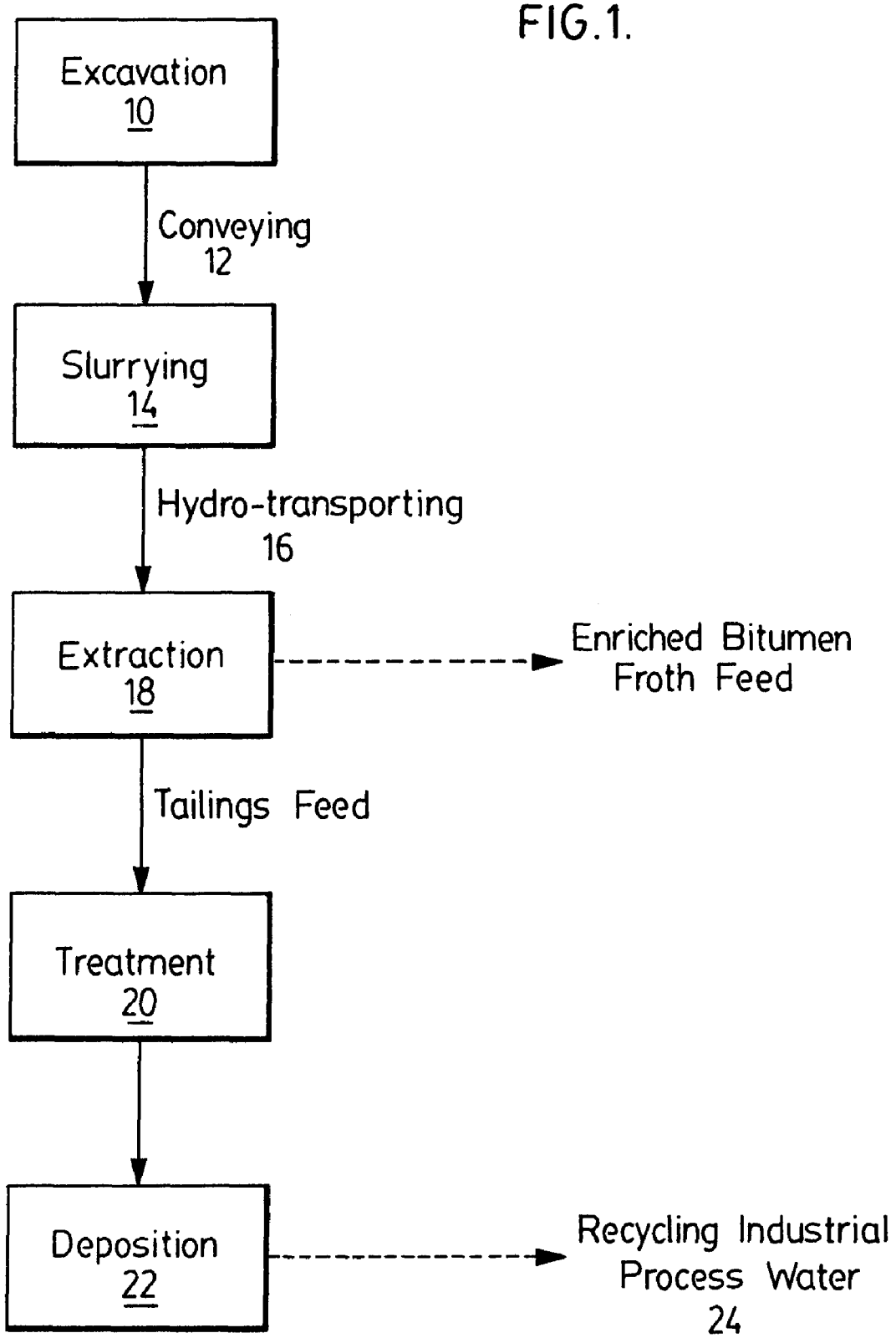
FIG. 1 is an illustration of an embodiment of the process of the present invention.

In one aspect the invention provides a process line for mining an oil sands ore body, the process line comprising an excavator for mining oil sands ore; a comminutor for receiving mined ore from the excavator, comminuting the mined ore to conveyable size and transferring the comminuted ore to a mobile conveyor for transporting the comminuted ore; the mobile conveyor having a free end, a discharge end and at least one drive for advancing the conveyor through an operational arc generally about the discharge end; whereby the excavator mines a section of ore within operational reach along the length of the mobile conveyor and supplies the mined ore to the comminutor, and the comminutor supplies conveyable ore to the mobile conveyor, and whereby the mobile conveyor is periodically moved about the discharge end to locate another portion of the ore body within operational reach of the mobile conveyor until substantially all of the ore body within the operational arc has been mined.

In a further aspect the invention provides a mobile conveyor for transferring mined oil sands ore from a mine face, the conveyor comprising: two or more conveyor sections; each of the two or more sections having at least one drive for advancing the conveyor, and at least one alignment device for detecting misalignment between at least one adjacent section and controlling the drive responsive to a detection of misalignment to align adjacent sections.

In a further aspect the invention provides a method of mining oil sands ore with a mobile conveyor, the method comprising:
at a first conveyor position:
excavating and sizing ore at a mine face within operational reach of the first position;
transferring the sized ore to the conveyor;
conveying the sized ore along the conveyor; and
discharging the sized ore;
after excavating, sizing and transferring substantially all the ore within operational reach of the conveyor in the first conveyor position, advancing the conveyor generally about the discharge end to a second conveyor position; and, excavating, sizing and transferring substantially all the ore within operational reach of the conveyor at the second position.

In a further aspect the invention provides a method of mining oil sand ore with a mobile conveyor, the method comprising: excavating, sizing and transferring to the conveyor all ore within operational reach along the length of the conveyor; conveying the sized ore along the conveyor to a discharge end of the conveyor; advancing the conveyor generally about the discharge end to locate the conveyor within operational reach of a further section of oil sand ore; excavating, sizing and transferring to the conveyor all ore in the further section within operational reach along the length of the conveyor; continuing to advance the conveyor about the discharge end to locate the conveyor within operational reach of additional sections of oil sand ore and after each advancement excavating, sizing and transferring the respective additional section of oil sand ore, until substantially all ore within an operational arc sector generally about the discharge end has been excavated, sized and transferred to the conveyor.

In a further aspect the invention provides a method of extracting a body of oil sand ore for conveyance to a mobile slurry facility, the method comprising: locating the mobile slurry facility near a mine face of a body of oil sand ore; positioning a mobile conveyor within operational reach of a section of the ore body and locating a discharge end of the mobile conveyor to convey mined ore to the mobile slurry facility; extracting the section of the ore body and conveying it to the mobile slurry facility; advancing the mobile conveyor generally about the discharge end to locate the mobile conveyor within operational reach of a further section of the ore body; extracting the further section of the ore body and conveying it to the mobile slurry facility; continuing to advance the conveyor and convey additional sections of the ore body to the mobile slurry facility until the ore within an arc sector about the discharge end of the conveyor has been extracted.

In a further aspect the invention provides a method of increasing the effective length of a mobile conveyor for conveying a mined ore, the method comprising:
(a) Locating a mobile conveyor within operational reach of a section of ore;
(b) Extracting the section of ore within operational reach of the conveyor and transferring the extracted ore to the conveyor;
(c) Advancing the conveyor generally about the discharge end to locate the conveyor within operational reach of a further section of ore;
(d) Repeating steps (b) and (c) until substantially all ore within operational reach of the conveyor has been extracted and,
(e) relocating the discharge end of the conveyor to a substantial center of the arc.

In a further aspect the invention provides a method for increasing the mineable volume of ore capable of being transported from the mine site to a discharge point using a mobile conveyor, the method comprising: Locating the mobile conveyor near a mine face with a discharge end located in communication with the discharge point;
Excavating a section of ore within operational reach of the mobile conveyor along the length of the conveyor; Repeatedly advancing the mobile conveyor through an operational arc generally about the discharge end to locate and extract additional sections of ore within operational reach along the length of the conveyor; and, Relocating the mobile conveyor to locate the discharge end in communication with a new discharge point located near the perimeter of the operational arc.

In a further aspect the invention provides a process line for excavating and processing oil sands ore near a mine face, the process line comprising: a mobile excavator for excavating ore along the length of a mobile mining conveyor; a mobile comminutor for receiving and comminuting excavated ore and transferring comminuted ore to the mobile mining conveyor; the mobile mining conveyor conveying the comminuted ore to a transfer conveyor; the transfer conveyor conveying the comminuted ore to a mobile slurry facility; the mobile slurry facility converting the comminuted ore into a slurry and pumping and conditioning the slurry through a hydro-transport pipeline to a mobile extraction facility; the mobile extraction facility receiving the slurry and combining with a water stream to separate a bitumen stream and a tailings stream from the slurry; herein the bitumen stream is directed to a separation facility and the tailings stream is directed to a tailings treatment facility.

In a further aspect the invention provides a process line for excavating and processing oil sands ore near a mine face, the process line comprising: a mobile excavator for excavating ore along the length of a mobile mining conveyor; a mobile comminutor for receiving and comminuting the excavated ore and transferring the comminuted ore to the mobile mining conveyor; the mobile mining conveyor conveying the comminuted ore to a transfer conveyor; the transfer conveyor conveying the comminuted ore to a mobile slurry facility; at the mobile slurry facility combining the comminuted ore with process water to produce a slurry and pumping and conditioning the slurry through a hydro-transport pipeline to a mobile extraction facility as a slurry feed; at the mobile extraction facility receiving the slurry feed and directing the slurry feed and a water stream as inputs to a three stage countercurrent cyclone separator; the cyclone separator producing a bitumen rich stream and a tailings stream; the bitumen rich stream being directed to a froth concentration unit; the froth concentration unit separating the bitumen rich stream into a bitumen product stream, a recycled water stream and a fine tailings stream; the fine tailings stream being combined with the tailings stream to produce a tailings product stream; the tailings product stream being directed to a tailings treatment facility; the tailings treatment facility receiving the tailings product and combining the tailings product with an additive to produce a treated tailings stream; the treated tailings stream being directed to a tailings pond; the treated tailings stream being separated into a dry tails phase and a water phase; and, the water phase being collected at the tailings pond and recycled as industrial process water.

FIG. 1 is an illustration of the process overview of the present invention. The aim of the present invention is to provide a closed loop mining process that minimises the transport of the mineral component of the ore from the mine face and treats the tails to release the water component for reclamation as industrial process water. The process may be described as comprising the following main stages:

excavating the ore 10;
conveying the excavated ore to a slurry facility 12
slurrying the comminuted ore 14;
hydro-transporting the slurry to condition the slurry and transport it to an extraction facility 16;
extracting from the slurry an enriched bitumen froth feed and a tailings feed 18;
treating the tailings feed with an additive 20;
depositing the treated tailings feed at a deposition site 22; and,
recycling the reclaimed water as industrial process water 24.

Figure 2:
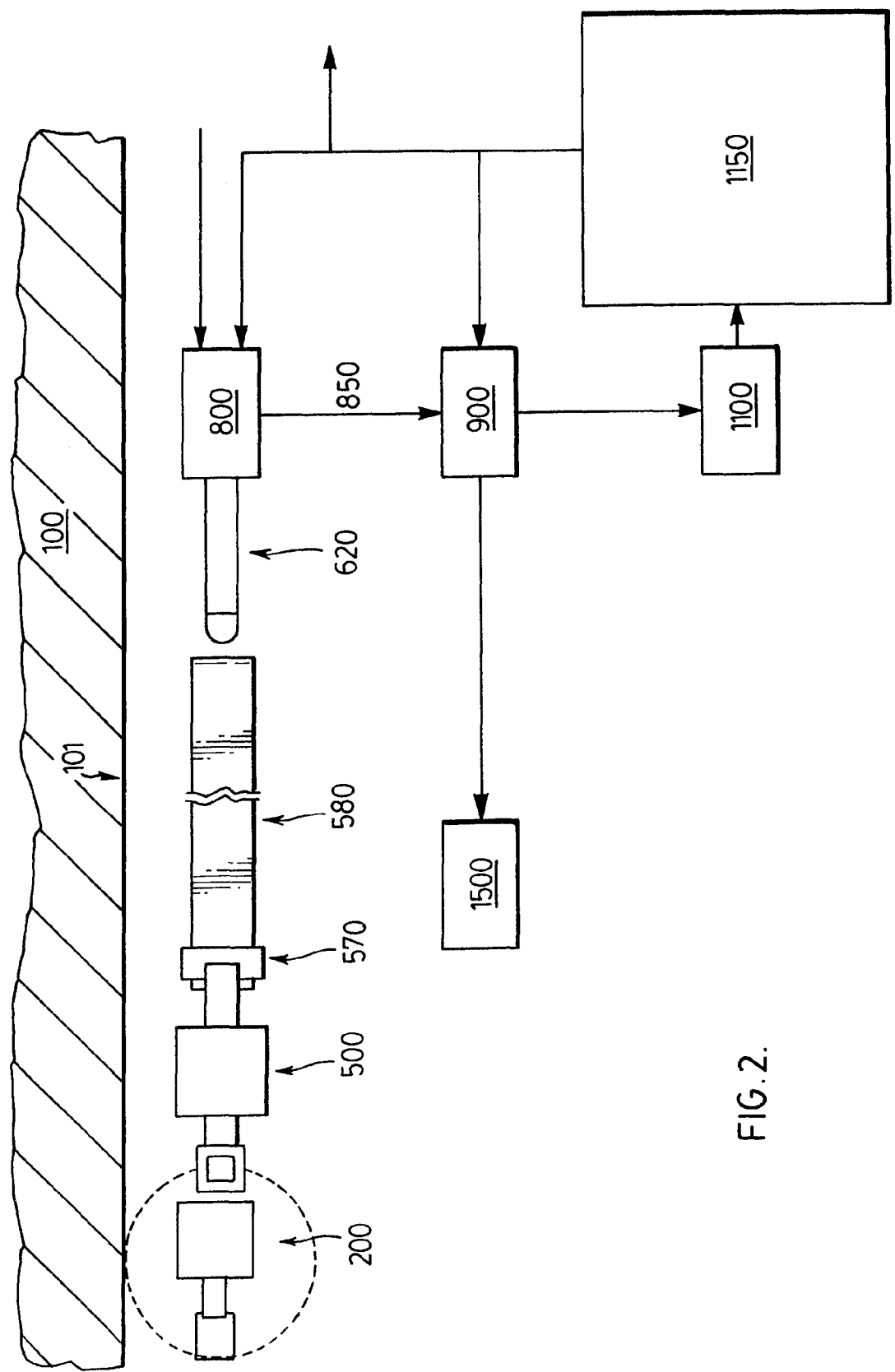
FIG. 2 is a top view illustration of an embodiment of the process line of the present invention.

FIG. 2 depicts the process line of the present invention comprising a mobile excavator 200 that excavates ore from a mine face 101 and transfers the excavated ore to a mobile comminutor 500. The mobile comminutor 500 comminutes the ore to transportable size for delivery to a mobile mining conveyor 580. The mobile mining conveyor 580 delivers the crushed ore to a mobile slurry facility 800 where the crushed ore is converted into a slurry with the addition of hot process water and further comminuting and screening. Optionally process agents or conditioning aids may be added to the slurry at the mobile slurry facility 800. The slurry is pumped through a hydro-transport pipeline 850 to a mobile extraction facility 900 where the bitumen is separated from the mineral component. The separated bitumen is diverted to a secondary extraction facility 1500 while the mineral component is directed for tailings treatment 1100 prior to being deposited at a tailings deposition site 1150. Tailings treatment 1100 preferably comprises the addition of an additive to the tailings to assist in separation of the water component of the tailings from the sand and fines. The treated tailings are then deposited at tailings deposition site 1150. After separation of the water from the solid component of the tailings, the water may be collected at the tailings deposition site and recycled as industrial process water, either back into the process, for instance to be used in the slurry and extraction stages, or else directed for other industrial process water uses.

The stages of the process will now be described in more detail.

Figure 3:
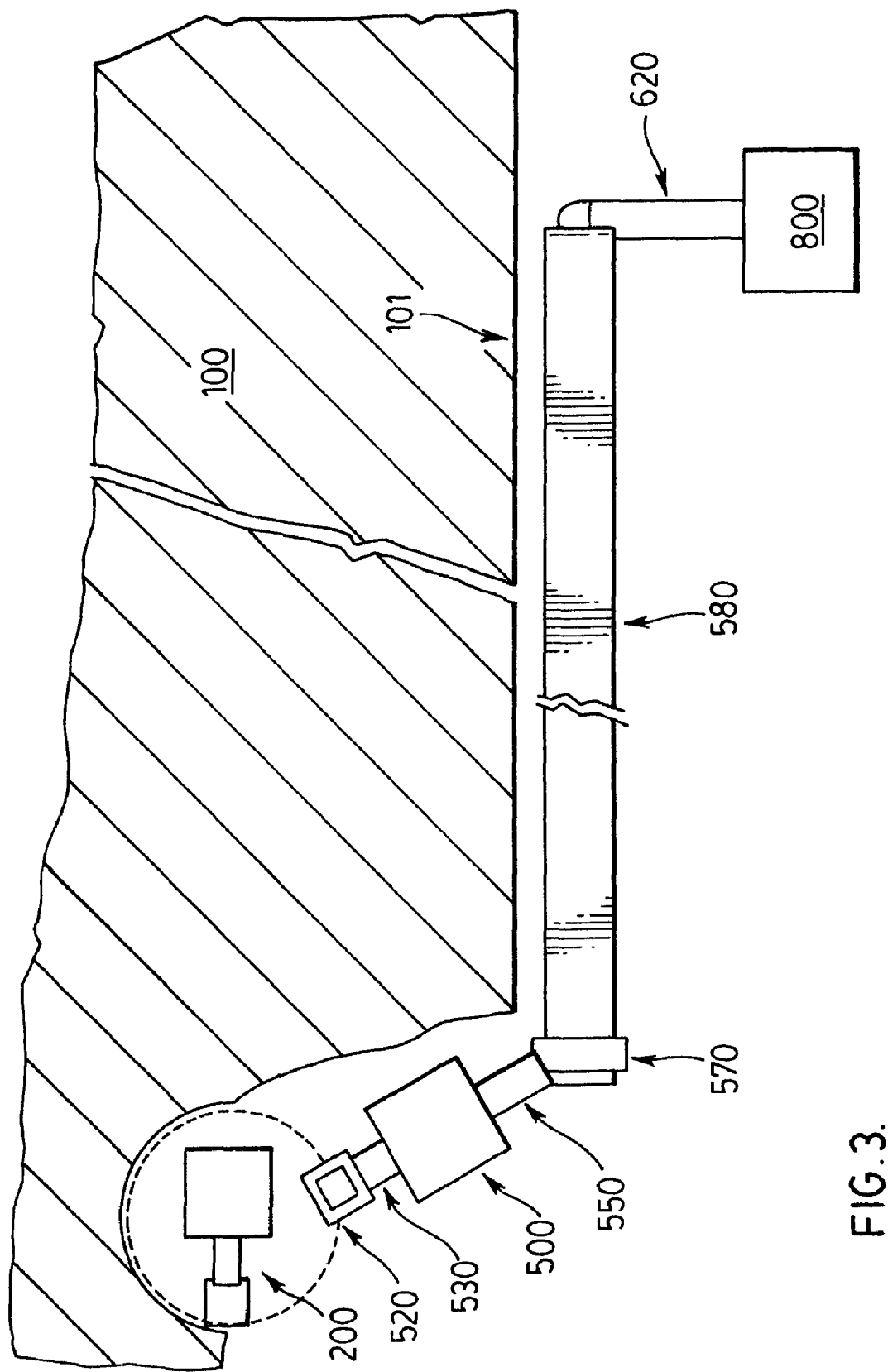
FIG. 3 is a top view illustration of an embodiment of the present invention.

Referring to FIG. 3, a top view of the excavation portion of the present invention is shown. A mobile excavator 200, for instance a shovel, removes ore from the ore body 100 at the mine face 101. The mobile excavator 200 transfers the ore to a mobile comminutor 500 before it is transported to the mobile slurry facility 800. The ore is deposited into the apron feed hopper 520 of the mobile comminutor 500 that feeds an apron feeder 530 to deliver the mined ore to primary comminuting rolls to comminute, or crush, the ore down to transportable size. The apron feed hopper 520 serves the dual purpose of receiving the excavated ore and acting as a "dry" surge or inventory of excavated ore by receiving buckets of excavated ore and delivering a steady stream of excavated ore to the primary comminuting rolls. The comminuted ore falls onto the discharge conveyor 550 for conveyance from the mobile comminutor 500 to a mobile mining conveyor hopper 570 for delivery to mobile mining conveyor 580. The mobile mining conveyor 580 conveys the comminuted ore to a transfer conveyor that delivers the ore to the mobile slurry facility 800.

Figure 4:
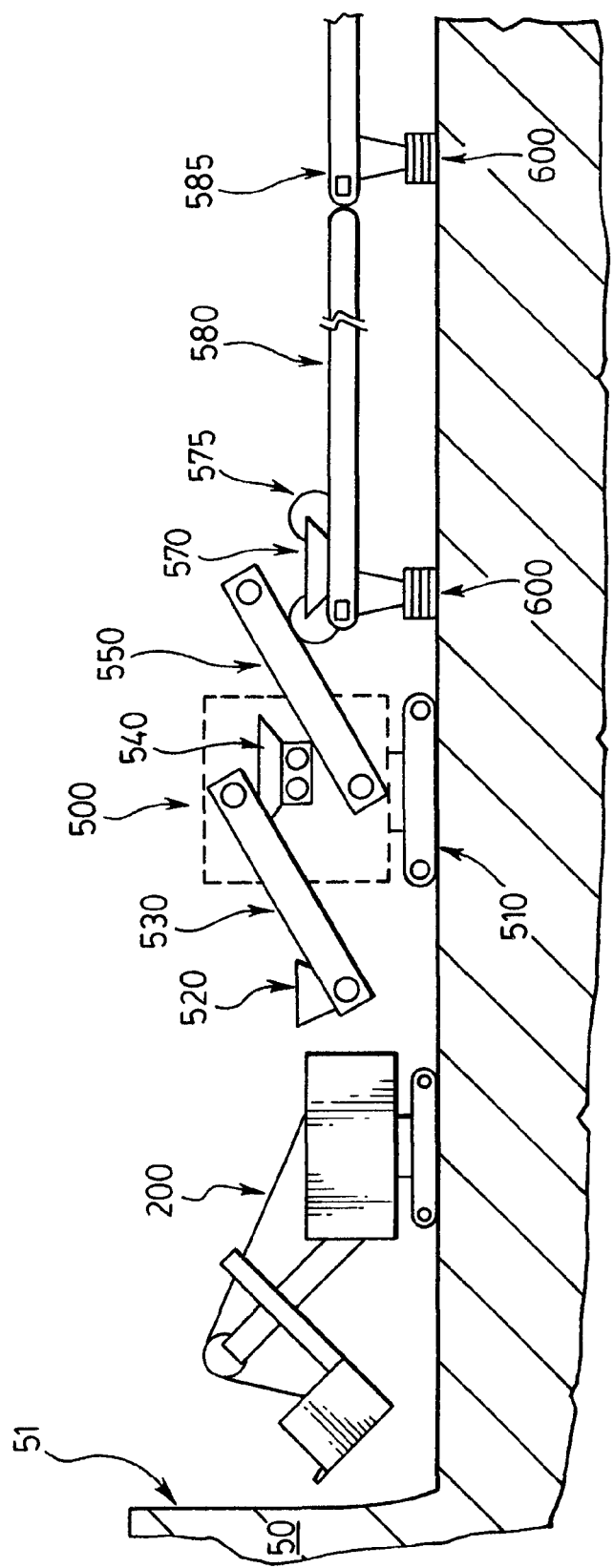
FIG. 4 is a side view illustration of an embodiment of the present invention.

Referring to FIG. 4, a side view of the excavation portion of the present invention is shown. The mobile excavator 200 is within close proximity of an ore body 100 and within operational reach of a mine face 101. The mobile excavator 200 excavates ore from the mine face 101. Prior to transport, the excavated ore must be sized and screened for reject material such as metal. The mobile excavator 200 directs the excavated ore to the mobile comminutor 500 which comminutes and screens the ore. Generally, the mobile comminutor 500 preferably includes tracks 510, an apron feeder hopper 520, an apron feeder 530, primary comminuting rolls 540 and a discharge conveyor 550. Cable reels 575 transported by the mobile mining conveyor hopper 570, supply power and communication cables to the excavator 200, and mobile comminutor 500.

FIG. 5 is an illustration of the preferred embodiment of a mobile comminutor 500 according to the present invention. The ore is initially deposited by the excavator 200 into the apron feeder hopper 520 which directs the ore onto an apron feeder 530. The apron feeder 530 conveys the ore to the primary comminuting rolls 540 which comminutes the ore down to a conveyable size typically limiting ore pieces to a diameter of approximately less than about 350 mm. The apron feeder 530 and primary comminuting rolls 540 also preferably includes at least two level detectors. The feeder level detector 532 is directed down the apron feeder 530 to detect large lumps of ore travelling up the apron feeder 530. When a large lump is detected, the feeder level detector 532 alerts the apron feeder 530 to slow down, to allow the material to be processed by the primary comminuting rolls 540. Similarly, sizing level detector 534 is directed across the primary comminuting rolls 540 to detect a build-up of material at the primary comminuting rolls 540. If the level of ore begins to build up above the primary comminuting rolls 540, the comminuting level detector 534 alerts the apron feeder 530 to slow down the delivery of ore to allow time for the primary comminuting rolls 540 to process the built up ore. Preferably the speed of the apron feeder 530 is also controlled by a weight sensor located on the discharge conveyor 550. By controlling the speed of the apron feeder 530 using the level detectors and weight sensor, a steady supply of transportable sized ore may be provided to the mobile mining conveyor 580. Optionally, heaters 522 may be provided at the hoppers and elsewhere as required to minimize build-up of ore when operating under extreme cold conditions.

The mobile comminutor 500 preferably includes tracks 510 to permit relocation of the mobile comminutor as the excavator 200 works the ore body. Optionally the mobile comminutor 500 includes supports 515 that are preferably lowered during operation while the excavator 200 is working a section of the ore body 100 to stabilise the mobile comminutor 500. The supports 515 may preferably be raised to permit the mobile comminutor 500 to relocate when the excavator 200 moves to a new section of the ore body 100. It will be appreciated that supports 515 may be replaced by additional tracks 510, or dispensed with entirely, depending upon the weight distribution and stability of the mobile comminutor 500.

The sized ore is directed to a discharge conveyor 550 for delivery to the mobile mining conveyor 580. Ore that is too large, or too hard to be crushed in the primary comminuting rolls 540, is directed to a reject door and discharged out the reject chute to the ground below the mobile comminutor 500. Preferably the ore is also screened at the mobile comminutor 500 for metal contaminant, such as excavator teeth. As will be appreciated, other methods of screening the ore for metal and discarding metal are possible, such as screening the ore downstream after conveyance by the mobile mining conveyor 580. Most preferably, however, the mobile comminutor 500 includes a metal detector 552 to examine the sized ore on the discharge conveyor 550 for metal contaminants. If metal is detected by metal detector 552, the apron feeder 530 and discharge conveyor 550 may be temporarily halted and a reject chute in the mobile mining conveyor hopper 570 may be aligned under the discharge point of the discharge conveyor 550. The discharge conveyor 550 then advances until the metal is discarded off the discharge conveyor 550 and into the reject chute. The discharge conveyor 550 is then temporarily halted again while the mobile mining conveyor hopper 570 is re-aligned to direct discharged ore to the mobile mining conveyor 580.

Referring to FIG. 6, the sized ore is first delivered to a mobile mining conveyor hopper 570 by the discharge conveyor 550. The mobile mining conveyor hopper 570 preferably traverses along rails or tracks that run the length of the mobile mining conveyor 580. As the excavator 200 advances along the mine face, the mobile comminutor 500 follows the progress of the excavator. The mobile mining conveyor hopper 570 traverses along the transfer conveyor 580 to receive the crushed ore from the discharge conveyor 550 and deliver it to the mobile mining conveyor 580 for conveyance. Preferably, the mobile mining conveyor hopper 570 conveniently includes cable reels 575 to spool out power and communication cables to the mobile comminutor 500 and excavator 200 as they traverse along the mine face 101. In this manner, the power generation or transmission connection may be conveniently located at the discharge end 590, of the mobile mining conveyor 580, minimizing the need to move such equipment. The mobile mining conveyor 580 also preferably comprises crawler tracks 600 distributed along the length of the conveyor which enables the mobile mining conveyor 580 to advance laterally or to advance about and end of the mobile mining conveyor 580. Optionally, the mobile mining conveyor 580 may be accompanied by a fluid trailer 585 that supplies water or glycol to be sprayed on the transfer conveyor 580 belt to prevent material from sticking to the belt in extreme weather conditions.

In a preferred embodiment the mobile mining conveyor 580 is comprised of multiple conveyor sections that are connected together to create a chain of conveyor sections that collectively comprise the mobile mining conveyor 580. A continuous belt is supported by the sections to convey ore to the discharge end of the mobile mining conveyor 580. Preferably, each section includes at least one crawler track 600 to reposition that section. More preferably the crawler tracks 600 are provided with independent height adjustable supports connecting the crawler tracks 600 to the mobile mining conveyor 580. In a preferred embodiment the sections are joined by pivot joints and an alignment gauge 585, such as string pots, is used to determine whether a section is inline with its adjacent sections. If the section is not inline, the section's crawler track 600 is repositioned until the section is inline and horizontal. In this way, the mobile mining conveyor 580 may be advanced generally about the discharge end 590 by manually advancing the free end to a desired location. With the advancement of the free end crawler track, the adjacent section will no longer be inline with the end section. Upon detecting mislevel or misalignment, the adjacent section crawler track is also repositioned to maintain level alignment with the end section. Similarly, the next section in the chain detects a misalignment with the adjacent section and its crawler track is repositioned to maintain level alignment. In this way the mobile mining conveyor 580 may be advanced about the discharge end 590 by manually advancing the free end crawler until it is in operational proximity to the current mine face 101. Alternatively the crawler tracks 600 may be controlled by a central motion controller to co-ordinate the advancement of all crawler tracks 600.

One advantage of employing a mobile mining conveyor 580, over a relocatable conveyor, is that material that spills over the sides of the mobile conveyor does not significantly accumulate in a particular location. Depending upon the duration of operation the amount of spilled material that may accumulate around a relocatable conveyor may be considerable. By mining with a mobile mining conveyor 580, the process avoids the need to clear spilled material prior to relocating the conveyor.

Figure 8:
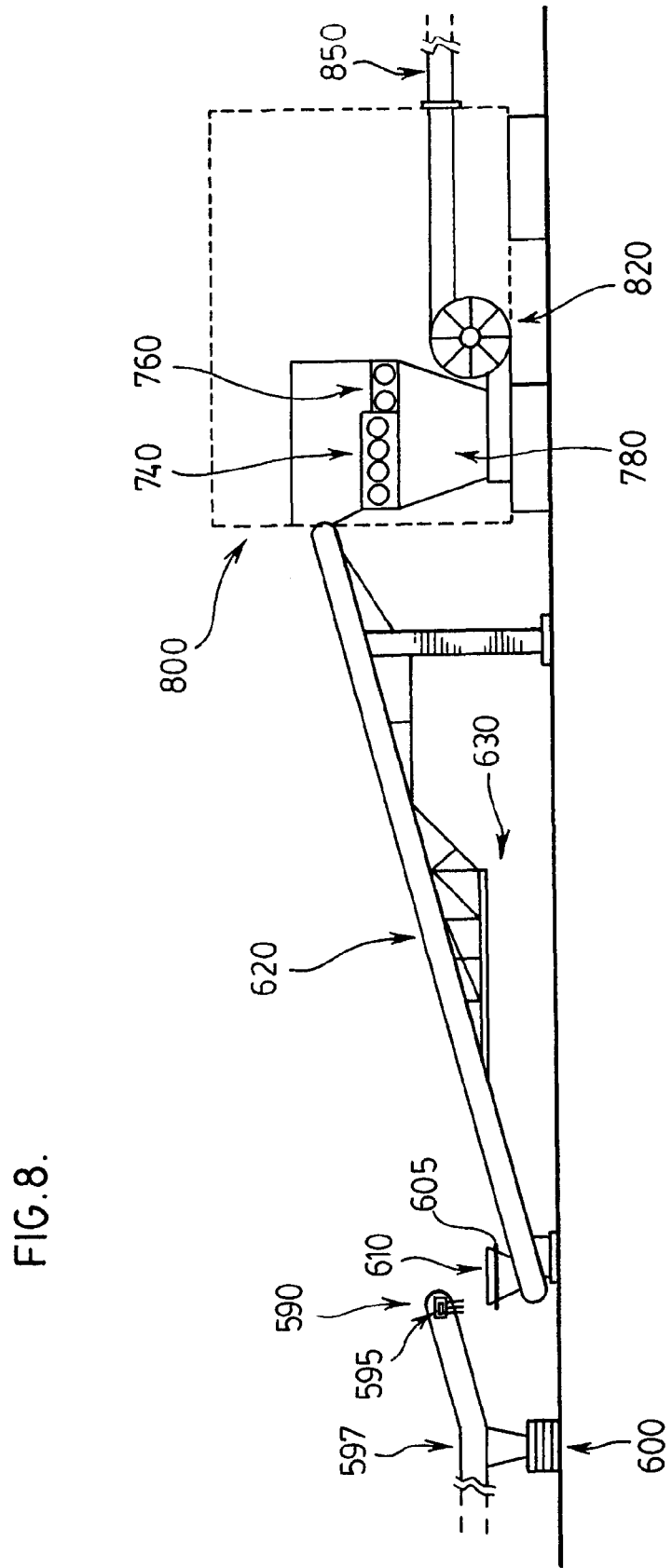
FIG. 8 is a side view illustration of an embodiment of the present invention.

Referring to FIGS. 7 and 8, at the discharge end 590 of the mobile mining conveyor 580, the sized ore is deposited into a transfer conveyor hopper 610 that feeds the sized ore onto a transfer conveyor 620 that transports the material to the feed chute of a mobile slurry facility 800.

The mobile mining conveyor 580 conveys sized ore along its length to the discharge end 590. The discharge end 590 is in communication with a discharge point such that as sized ore is discharged off the discharge end 590, it continues in a projectile motion to the discharge point a short distance from the discharge end 590. In operation the mobile mining conveyor 580 is positioned such that the discharge point of the mobile mining conveyor is aligned with a target, in this case approximately the center of the transfer conveyor hopper 610. Preferably a location sensor is included to assist in locating the discharge point of the mobile mining conveyor 580 central to the transfer conveyor hopper 610, and maintaining its alignment with respect to transfer conveyor hopper 610, while advancing the mobile mining conveyor 580 about the transfer conveyor hopper 610.

According to a preferred embodiment of the present invention, the mobile mining conveyor 580 consists of multiple independent sections. One of the advantages of the preferred embodiment is that each section may be individually powered and operated depending upon the location of the mobile mining conveyor hopper 570. Similarly, since each section is independently mobile, each section may be replaced as necessary if it breaks down while in service. Alternatively, a section may be removed from the mobile mining conveyor 580 and operation may continue, albeit with a mining conveyor of shorter length. Preferably the conveyor belt is a continuous belt as known in the art. Conveyor sections may be added or removed by adding or removing sections of the belt to accommodate the change in the length of the conveyor.

In a preferred embodiment the location sensor is optical sensor 595 located at the discharge end 590 that monitors the location of a positioning ring 605 located around the transfer conveyor hopper 610. As the mobile mining conveyor 580 is advanced about the transfer conveyor hopper 610, the optical sensor 595 monitors the location of the positioning ring 605 and provides feedback to control the advancement of the tracks 600 on the discharge conveyor section 597 so as to maintain the discharge point in the transfer conveyor hopper 610. Since the discharge end 590 is located with reference to the transfer conveyor hopper 610, the geometry of the transfer conveyor hopper 610 may effect the path through which the discharge end 590, and hence the mobile mining conveyor 580, may travel. For instance, the transfer conveyor hopper 610 may be circular in which case the discharge end 590 will travel in a generally circular fashion. Alternatively, the transfer conveyor hopper 610 may be elongate in which case the discharge end 590 may travel in a generally arcuate fashion.

As described above, the mobile mining conveyor 580 conveys the sized ore off the discharge end 590 to a discharge point aligned with the transfer conveyor hopper 610 of a transfer conveyor 620 for delivery to the mobile slurry facility 800 where it is converted into a slurry and pumped into pipe-line 850 for transport to a de-sanding facility en route to a bitumen upgrader facility. Since the mobile mining conveyor 580 advances about the transfer conveyor hopper 610, the transfer conveyor 620 may remain stationary throughout the execution of an operational arc. Preferably the transfer conveyor 620 is provided with a platform 630 on its underside for engaging a crawler when the transfer conveyor 620 is to be repositioned. In this embodiment it is unnecessary to include a motive drive on the transfer conveyor 620 since it remains stationary for extended periods of time.

Figure 9A:
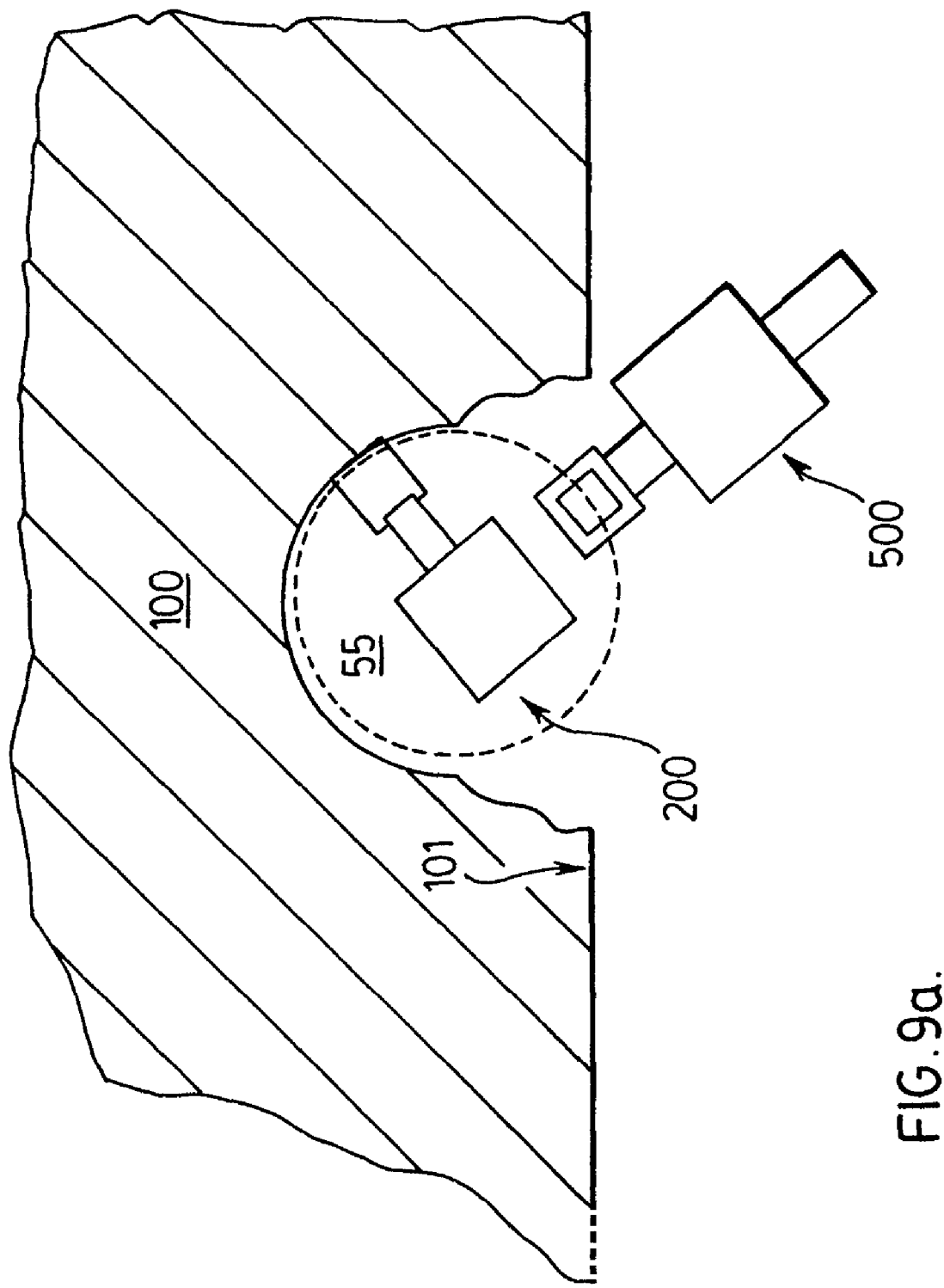
FIGS. 9*a*-9*c* are top view illustrations of an embodiment of the present invention.
Figure 9B:
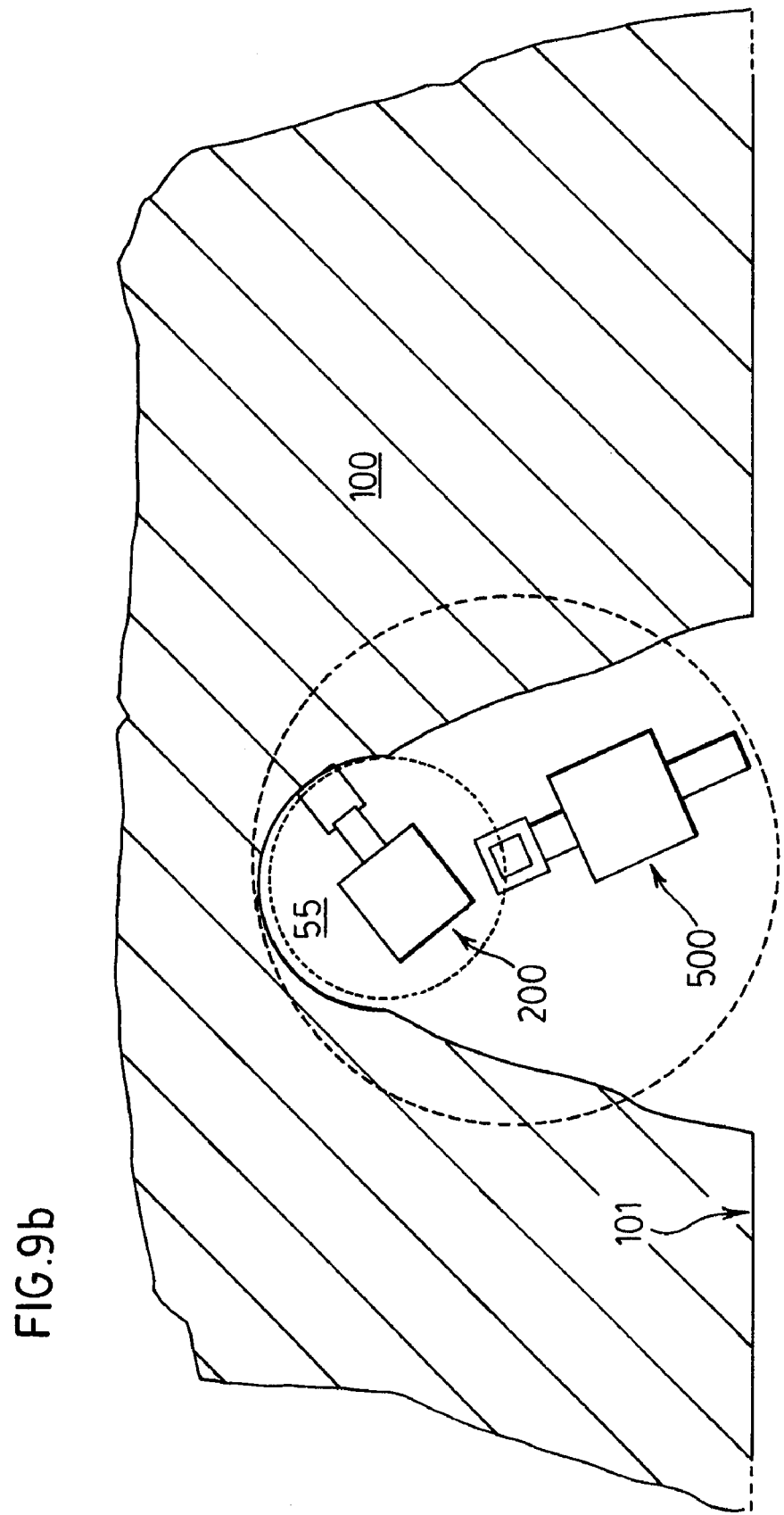

Referring to FIGS. 9*a*-9*b*, preparation of an ore body according to a preferred embodiment of the present invention is presented. Preferably, the ore body is prepared by initially excavating a "pocket" 55 into the mine face 101 with the excavator 200 and mobile comminutor 500 to remove all of the ore within operational reach of the excavator 200 and mobile comminutor 500 while a discharge point off the discharge conveyor 550 is located outside the pocket 55 being excavated. The purpose of excavating the pocket 55 is to permit location of the mobile slurry facility 800 as close as possible to the mine face to facilitate removing the greatest possible volume of ore while the mobile slurry facility 800 remains in a single location. While it is possible to operate the excavator 200 and mobile comminutor 500 further into the ore body beyond the operational reach of the excavator 200 and mobile comminutor 500, limiting excavation to their operational reach with the discharge point being located outside the pocket 55 minimises the need to employ additional equipment to transport the ore clear of the pocket 55.

Figure 9C:
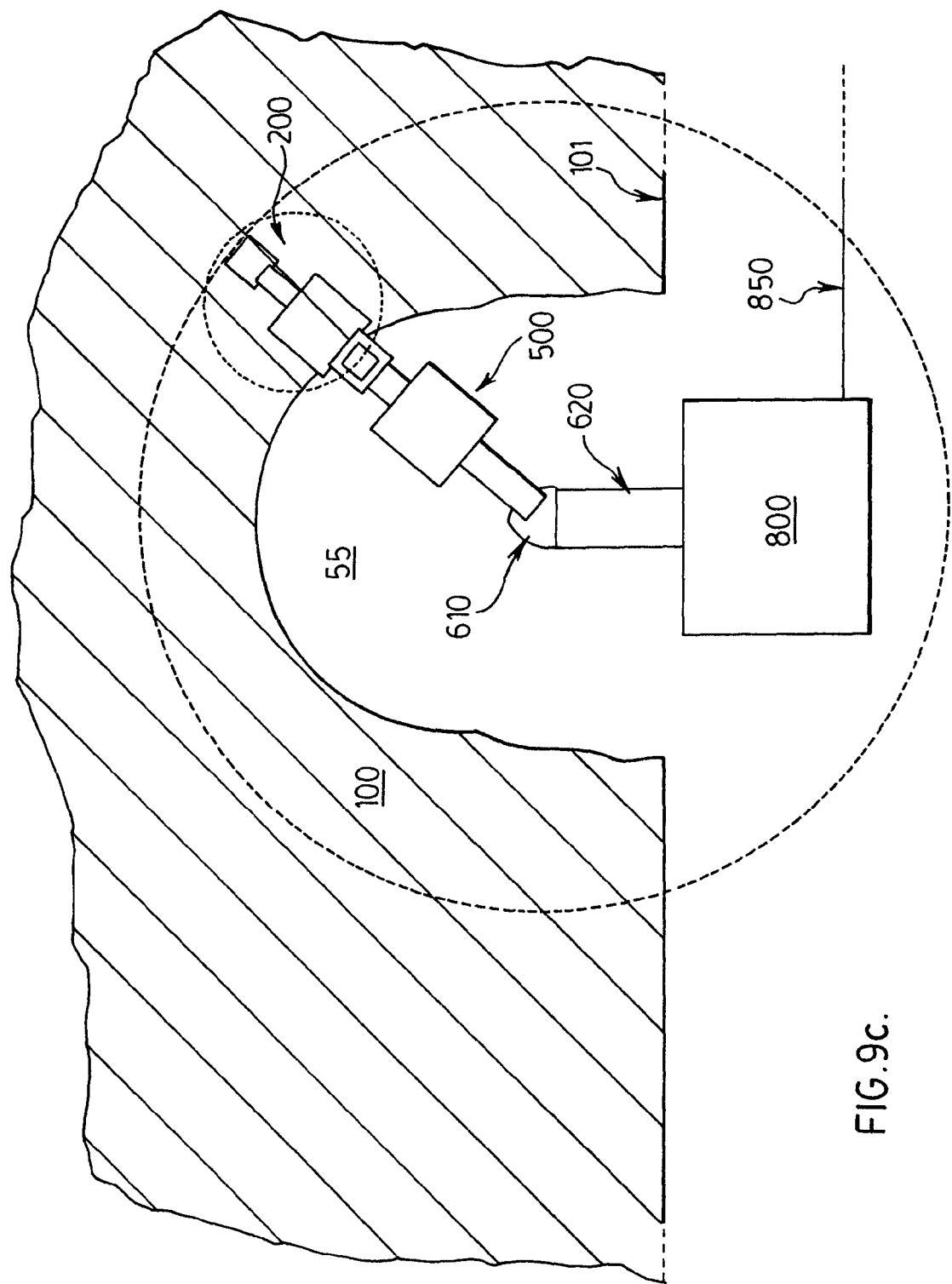

As illustrated in FIG. 9*c*, after excavation of the initial pocket, the mobile slurry facility 800 and transfer conveyor 620 may be positioned such that the transfer conveyor hopper 610 is located in the pocket, thus locating the mobile slurry facility 800 at an optimal location for removing a maximum volume of ore before having to move the mobile slurry facility 800. Optionally, as illustrated in FIG. 9*c*, the excavator 200 and mobile comminutor 500 may continue to work the ore body to enlarge the pocket 55 without the mobile mining conveyor 580 by locating a discharge point off the discharge conveyor 550 in the apron feed hopper 610. An additional volume of the ore body is within operational reach of the excavator 200 and mobile comminutor 500 when the discharge point is located in the transfer conveyor hopper 610 within the pocket 55. The advantage of excavating an enlarged pocket by delivering the ore directly from the mobile comminutor 500 to the transfer conveyor hopper 610 is that it consumes less energy and results in less wear and tear on equipment. Optionally, the ore excavated during the initial pocket excavation, illustrated in FIGS. 9*a*-9*b*, may be fed into the mobile slurry facility 800 at this time by depositing the ore in the transfer conveyor hopper 610. Alternatively, the initially excavated ore may be retained as a dry surge to feed to the mobile slurry facility during excavation down time such as excavator shovel repairs or conveyor maintenance.

Figure 10A:
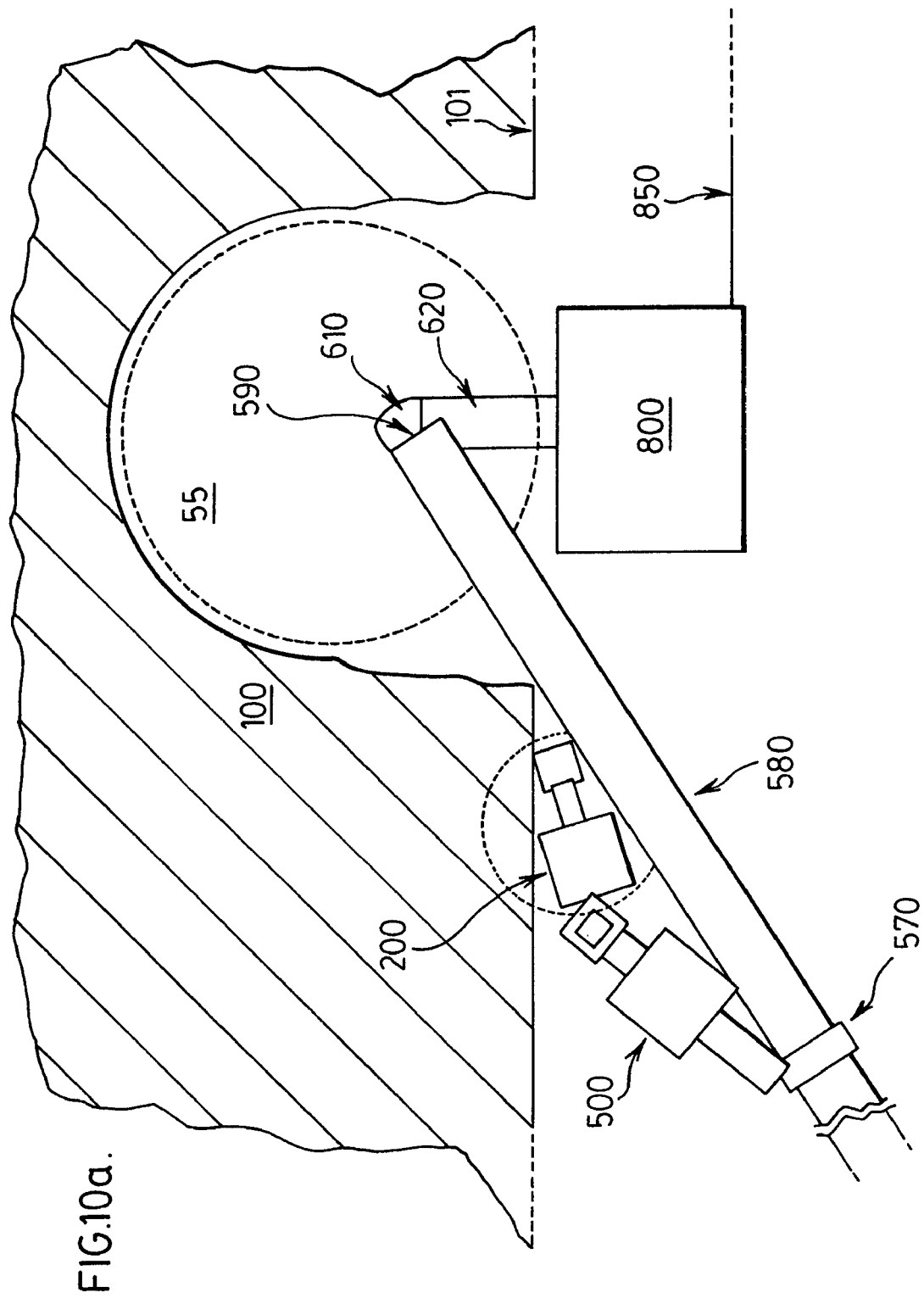

Referring to FIGS. 10*a*-10*e* a top view schematic of the process of the present invention is presented. FIG. 10*a* illustrates a close-up top view of a mining cell according to an embodiment of the present invention with the ore body 100 and the mobile mining conveyor 580 in an initial position. The excavator 200 removes ore from a mine face 101 and delivers it to a mobile comminutor 500 by depositing it in the apron feed hopper 520 to be directed to an apron feeder 530. The apron feeder 530 carries the ore to primary comminuting rolls 540, not shown in this view, for crushing before the ore is directed to the discharge conveyor 550 to be transferred to the mobile mining conveyor hopper 570 to direct the ore to the mobile mining conveyor 580 for delivery off the discharge end 590 of the mobile mining conveyor 580 to a discharge point. Preferably, the mobile mining conveyor 580 is oriented to position the discharge point in a transfer conveyor hopper 610. Most preferably the mobile mining conveyor 580 positions the discharge point at or near the center of the transfer conveyor hopper 610. The transfer conveyor hopper 610 supplies the conveyable ore to a transfer conveyor 620 that delivers the ore to a mobile slurry facility 800. The mobile slurry facility 800 adds HPW to convert the ore into a slurry that is pumped into a pipe-line 850 for hydro-transport.

Figure 10B:
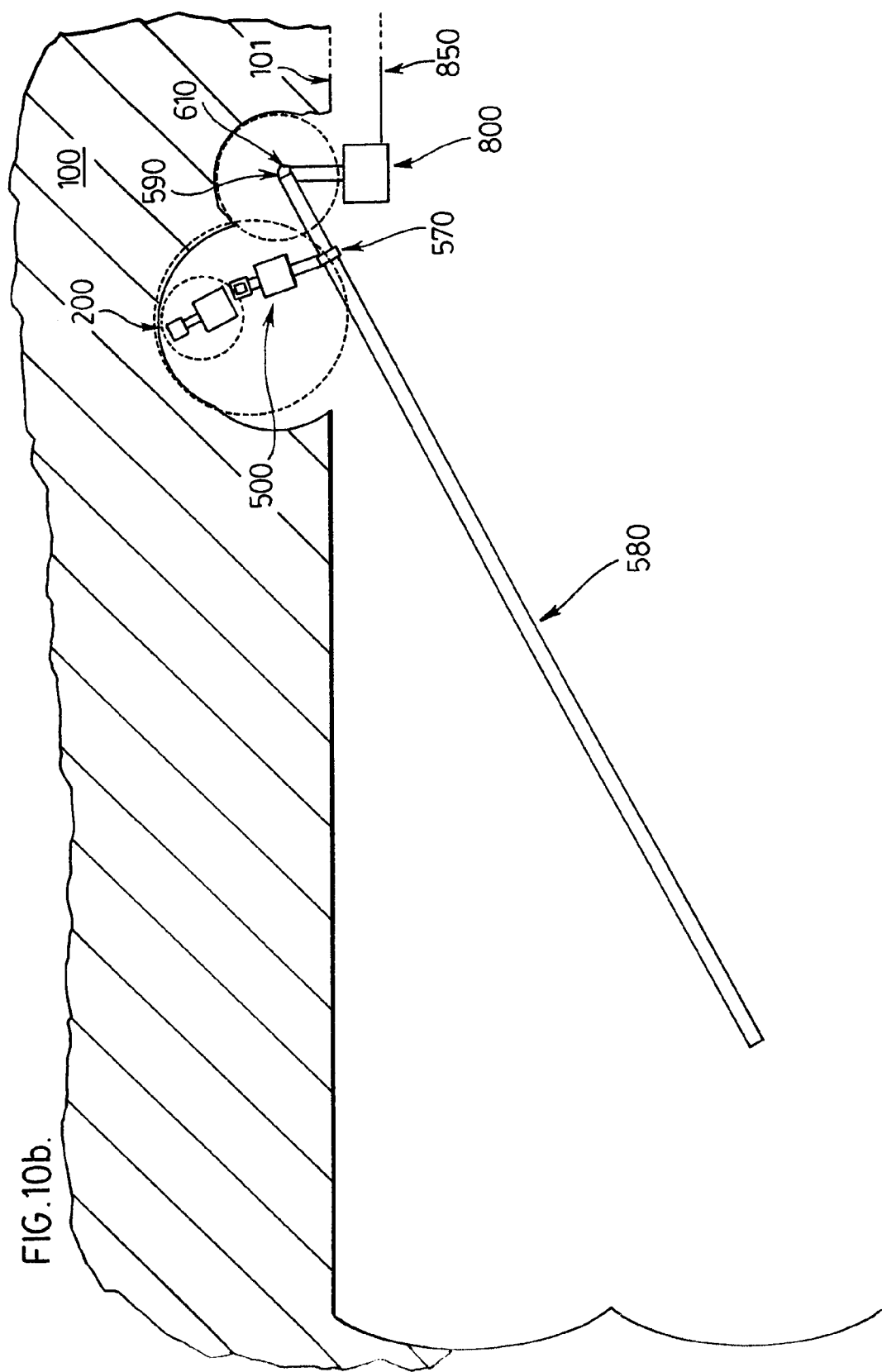

FIG. 10*b* illustrates the mining cell in a top view with the ore body 100 to be excavated and the excavator 200, mobile comminutor 500 and mobile mining conveyor hopper 570 starting at an end of the mobile mining conveyor 580 and removing ore within operational reach along the length of the mobile mining conveyor 580.

Figure 10C:
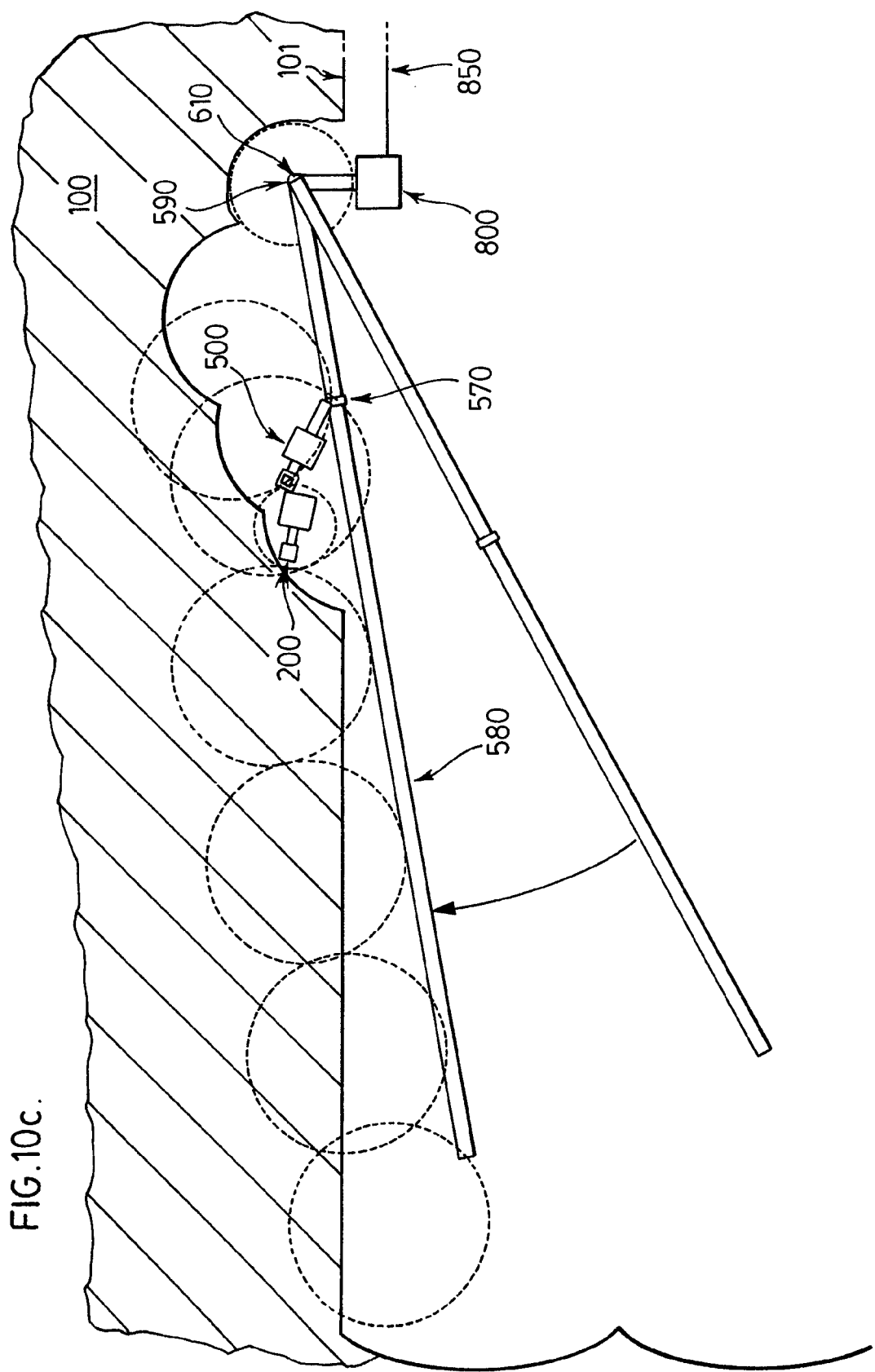

FIG. 10*c* illustrates the mining cell in a top view after all the ore within operational reach of the mobile mining conveyor 580 in the first position has been excavated and the conveyor has been advanced about the discharge end 590 to position a further section of ore within operational reach of the mobile mining conveyor 580 while locating the discharge point in the transfer conveyor hopper 610. As illustrated, once the mobile mining conveyor 580 has been advanced, the excavator 200, mobile comminutor 500 and mobile mining conveyor hopper 570 move along the mobile conveyor 580 and excavate the ore within operational reach of the mobile mining conveyor 580. After all the ore within operational reach of the mobile mining conveyor 580 has been excavated, the mobile mining conveyor 580 is again advanced about the discharge end.

FIG. 10*d* illustrates the mining cell in a top view with the ore body 100 and the mobile mining conveyor 80 having been advanced to a further position and the excavator 200, mobile comminutor 500 and mobile mining conveyor hopper 570 having completed excavating all the ore within operational reach of the mobile mining conveyor 580 in the further position.

FIG. 10*d* illustrates the mining cell in a top view with the ore body 100 and the mobile mining conveyor 80 having been advanced to a further position and the excavator 200, mobile comminutor 500 and mobile mining conveyor hopper 570 having completed excavating all the ore within operational reach of the mobile mining conveyor 580 in the further position.

Figure 10E:
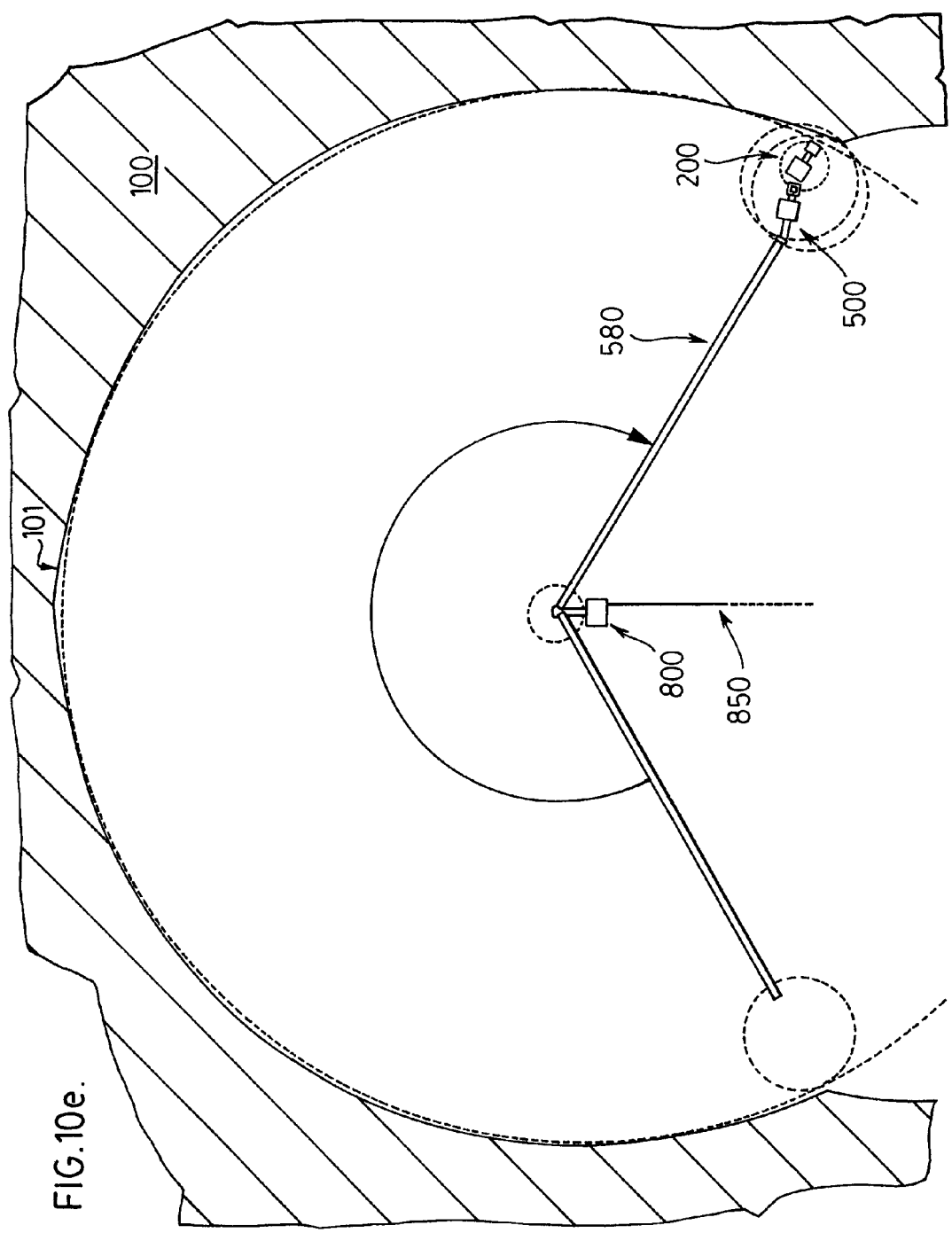

FIG. 10*e* illustrates the mining cell in a top view with the ore body 100 and mobile mining conveyor 80 having been advanced through an operational arc about the discharge end and the excavator 200 and mobile comminutor 500 having excavated, comminuted and transferred to the mobile mining conveyor hopper 570 an operational arc sector of ore.

Figure 10F:
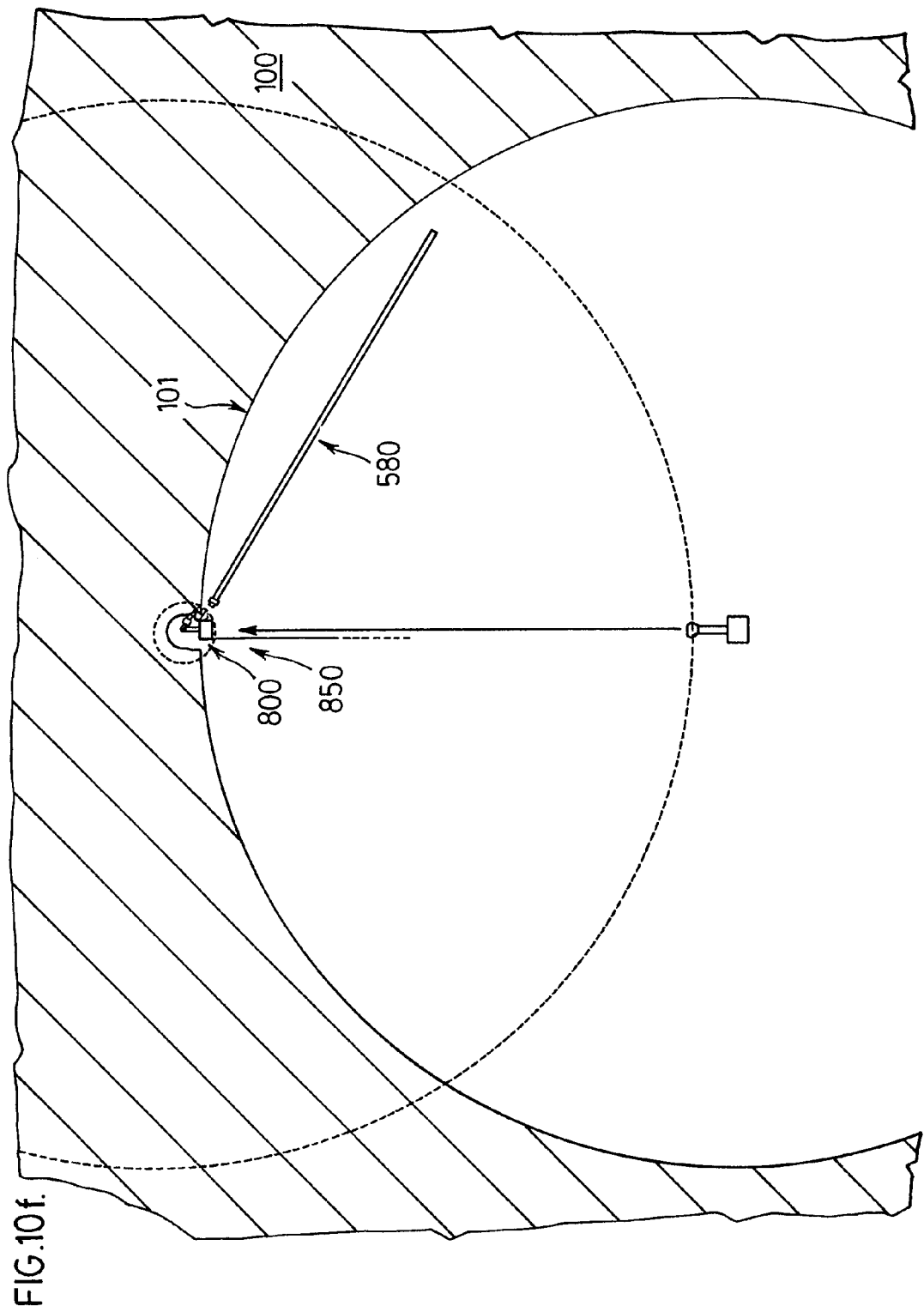

FIG. 10*f* illustrates the mining cell in a top view with the ore body 100 after the excavator 200 and mobile comminutor 500 have prepared an initial pocket at the perimeter of the excavated arc sector. The mobile slurry facility 800 has been moved from its prior location to be in close proximity to the mine face 101 with the transfer conveyor 620 located in the pocket. The excavator 200 and mobile comminutor 500 are initiating excavation of an enlarged pocket about the transfer conveyor hopper 610. The mobile mining conveyor 580 has been positioned in close proximity to the mobile slurry facility 800 and transfer conveyor 620 to begin operation after the excavator 200 and mobile comminutor 500 have completed the enlarged pocket.

FIG. 11 illustrates the mining cell in a top view with the ore body 100 after the mobile mining conveyor 580 has been advanced through an operational arc sector about a mobile slurry facility 800. In comparison to the embodiment illustrated, a conventional fixed conveyor 575 of similar length is illustrated with the operational reach of the conventional fixed conveyor 575 illustrated with cross-hatching 585. As will be appreciated the effective length of the mobile mining conveyor 580 is greater than that of a conventional fixed conveyor 575 since a greater volume of ore may be excavated before relocating the mobile slurry facility 800 with a mobile mining conveyor 580 according to the present invention.

As described above, the discharge end 590 of the mobile mining conveyor hopper 580 delivers conveyable ore to the transfer conveyor hopper 610 of the transfer conveyor 620. The transfer conveyor 620 supplies the conveyable ore to the mobile slurry facility 800. Since the mobile slurry facility 800 preferably utilises gravity to assist in slurrying the ore, the transfer conveyor 620 serves to elevate the conveyable ore to the height of the mobile slurry facility 800 ore input chute. The use of a transfer conveyor 620 to offset the mobile slurry facility 800 from the discharge end 590 also provides the opportunity to increase the operational arc of the mobile mining conveyor hopper 580. Furthermore, a single mobile slurry facility 800 may be used to process ore from multiple mobile mining conveyors 580. In such an embodiment, the transfer conveyor 620 may be longer than the minimum length required for supplying conveyable ore to a mobile slurry facility 800 fed by a single mobile mining conveyor 580.

A mobile slurry facility 800 converts the conveyable ore delivered by the transfer conveyor 620 into a slurry for hydro-transport. In a preferred embodiment of the mobile slurry facility 800 the conveyable ore is first discharged from the transfer conveyor 620 into the roller screen feed chute 720. The roller screen feed chute 720 feeds the roller screen 740 to crush the ore to a convenient size for slurrying (typically less than 65 mm in diameter) and allow the crushed and sized ore to fall through the screen. Oversize material that does not fall through the roller screen 740 passes to an oversize comminutor 760 that crushes the lumps of oversize down to acceptable size. Hot Process Water (HPW) is typically introduced at the roller screen feed chute 720 and additional HPW is added directly over the roller screen 740 and oversize comminutor 760. The additional HPW assists in processing the ore, preventing ore buildup and defining the slurry density. The majority of the wet sized ore passes directly through the roller screen 740 for conversion to slurry in the slurry pump box 780. The remaining oversize is wetted and crushed by the oversize comminutor 760 before falling into the slurry pump box 780 for conversion to slurry. While it is possible to provide for an overflow chute to discard oversize, it is preferable to size the roller screen 740 and oversize comminutor such that they are capable of processing all of the ore supplied by the transfer conveyor 620.

Typically, HPW will be proportionately distributed approximately 70% at the roller screen feed chute 720, 20% at the roller screen 740 and 10% at the oversize comminutor 760. Where the invention includes a metal detector and reject ore discharge mechanism at the mobile comminutor 500, all of the ore received by the mobile slurry facility 800 may be processed using the roller screen 740 and oversize comminutor 760. While it is possible to detect metal in the ore at the roller screen 740, it is preferable to discard reject material as soon as possible in the process. Furthermore, it is preferable to discard reject material prior to processing by the primary comminuting rolls 540. One advantage of the combination of the mobile comminutor 500 and mobile slurry facility 800 of the present invention is that reject material is discarded near the location of excavation. As the excavator 200 works an ore body, detected reject material will be discarded near the location of its excavation. Not only does this avoid transporting reject material along the mobile mining conveyor 580 where it can damage equipment but it eliminates the need for reject material handling equipment at the mobile slurry facility 800 where it would be much more difficult to incorporate such equipment.

The sized ore and HPW falls into the slurry pump box 780 that is sized for a slurry retention time of approximately one minute. The slurry pump box 780 supplies the hydro-transport pump 820 with slurry. A one minute retention time is the preferred minimum to provide a wet surge capability to continuously supply slurry to the pump. When the level of slurry falls below a low level, Cold Process Water (CPW) may be added to maintain the level in the slurry pump box and ensure the hydro-transport pump 820 does not cavitate. As required, HPW may be added along with CPW to maintain a working temperature under cold conditions.

Emergency ponds are preferably located near the mobile slurry facility 800 to allow dumping of slurry from the mobile slurry facility 800 or the pipeline 850 under emergency conditions. The size of the emergency ponds is preferably large enough to accommodate the directed drainage of the contained volume of any one of the following: a drainable section of hydro-transport pipeline (24"), a drainable section of HPW pipeline (24"), a drainable section of CPW pipeline (20"), or the volume of the slurry pump box 780. The size of the drainable sections of the pipelines are site specific due to logistical and geographical features. The emergency pond is preferably serviced by a submersible pump which is able to return the pond fluids back to the process through the slurry pump box at the end of the emergency.

The slurry is pumped through the hydro-transport pipeline 850 to an extraction facility. As mentioned above, in addition to transporting the slurry, the hydro-transport process serves the secondary purpose of conditioning the slurry. The length of hydro-transport required to condition the slurry depends on several factors including the grade of ore, temperature of the ore, temperature of the process water and the size of ore being delivered to the slurry pump box. Typically, to be fully conditioned the slurry requires at minimal distance of one kilometre of hydro-transport distance.

Preferably the extraction facility is a mobile extraction facility 900 that receives as inputs the conditioned slurry as an ore slurry feed 1200 and process water 1205, and produces as outputs an enriched bitumen stream 1400 and a tailings stream 1450. In a preferred embodiment, the mobile extraction facility 900 comprises separate portable modules that may be transported to a location separately and then connected together in series to provide a single extraction facility. Preferably the mobile extraction facility 900 comprises a primary separation facility connected to a froth concentration facility. More preferably, the primary separation facility comprises two or more separate separation cyclone modules that are combinable in situ to comprise the primary separation facility. Most preferably, the primary separation facility comprises three separate separation cyclone modules connected in series in a countercurrent configuration. The use of separate modules allows for ease of portability and allows the process to be flexible to tailor the extraction facility to the ore body being excavated. For instance, a high grade ore body that contains very little fine solids/mineral component may not require the rigor of a three cyclone circuit, and in such a case the extraction facility may comprise only one or two of the modules. Generally, to accommodate all ore types, a three cyclone system is preferred. The modules preferably comprise transportable platforms, such as skids, that may be transported by crawlers or other motive modules. Alternatively, the modules may be provided with driven tracks.

In an alternate embodiment, the mobile extraction facility 900 comprises a single facility, containing all separation vessels and primary froth concentration equipment.

Use of a three stage cyclonic system is further advantageous in a mobile extraction system for several reasons. First, the size of each individual cyclone stage may be reduced since a three stage counter—current process results in a separation efficiency either equivalent to, or better than, current extraction methods. Second, each of the three cyclones may be transported separately, greatly improving the ease of relocating the extraction facility. Third, the use of a three stage countercurrent cyclonic system allows a mobile extraction facility to operate with a variety of ore grades. Fourth, as mentioned above, the number of stages may be tailored to match the separation efficiency with the grade of ore being processed.

Preferably each of the cyclone separation modules are self-contained and include a cyclone, as well as associated connections, pump boxes, and pumps. This way, if one unit has a mechanical failure, the extraction facility may be brought back online by simply replacing the faulty cyclone separation unit. Preferably the cyclone separation modules are connected in series in a countercurrent configuration in which the water stream and slurry stream enter at opposite ends of the three cyclone combination. Thus, for example, water entering the process (either make-up, recycled, or both) is first contacted with a bitumen-lean feed at the last cyclone separation unit in the series. The cyclonic separation units are preferably vertical cyclones, which have a reduced footprint. Suitable cyclonic separation vessels include those manufactured by Krebs Engineers (www.krebs.com) under the trademark gMAX.

Figure 17:
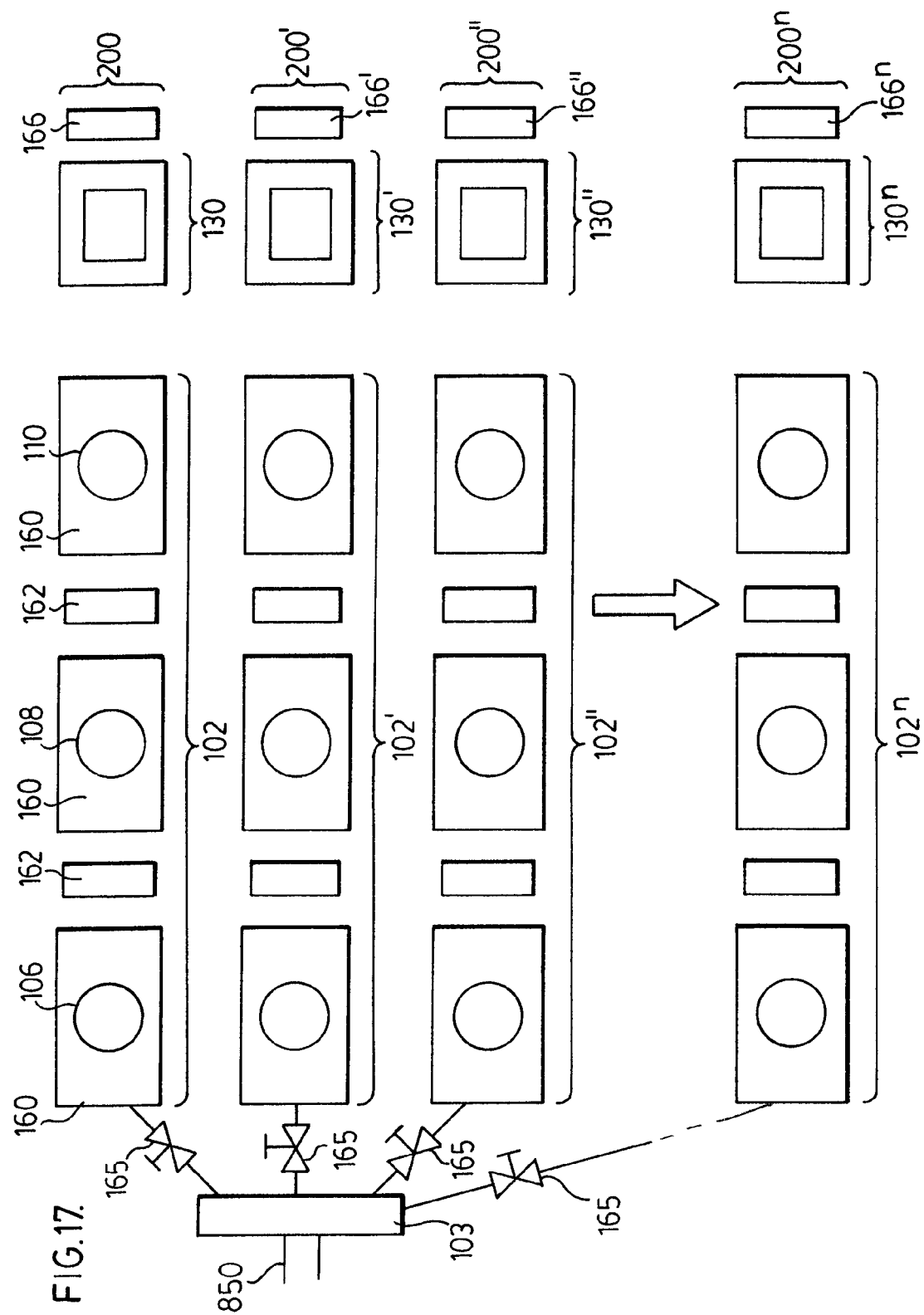
FIG. 17 is a schematic view showing an embodiment of a modular, mobile extraction system according to an aspect of the present invention incorporating a plurality of mobile cyclone separation stages forming a mobile cyclone separation facility and a mobile froth concentrator vessel defining a mobile froth concentration facility.

This modular arrangement of the extraction system provides for both mobility of the system and flexibility in efficiently handling of different volumes of ore slurry. For example, as illustrated in FIG. 17, a preferred setup according to an aspect of the invention in which each cyclone separation stage 106, 108 and 110 is mounted on its own independent skid 160 to form a mobile module. Positioned between each cyclone separation stage skid 160 is a separate pump skid 162 which provides appropriate pumping power and lines to move the froth streams and solid tailings streams between the cyclone separation stages. It is also possible that any pumping equipment or other ancillary equipment can be accommodated on skid 160 with the cyclone separation stage. In the illustrated arrangement of FIG. 17, groups of three mobile modules are combinable together to form cyclone separation facilities 102, 102', 102" to 102*n* as needed. Also associated with each cyclone separation facility is a mobile froth concentration facility 130 mobile modules comprising skids or other movable platforms with appropriate cyclone stage or froth concentration equipment on board may be assembled as needed to create additional mobile extraction systems 200', 200" to 200*n* to deal with increasing ore slurry flows provided by hydro-transport line 850. Ore slurry from the transport line 850 is fed to a manifold 103 which distributes the slurry to a series of master control valves 165. Control valves 165 control the flow of ore slurry to each mobile extraction system 200 to 200*n*. This arrangement also permits extraction systems to be readily taken off-line for maintenance by switching flow temporarily to other systems.

Figure 12:
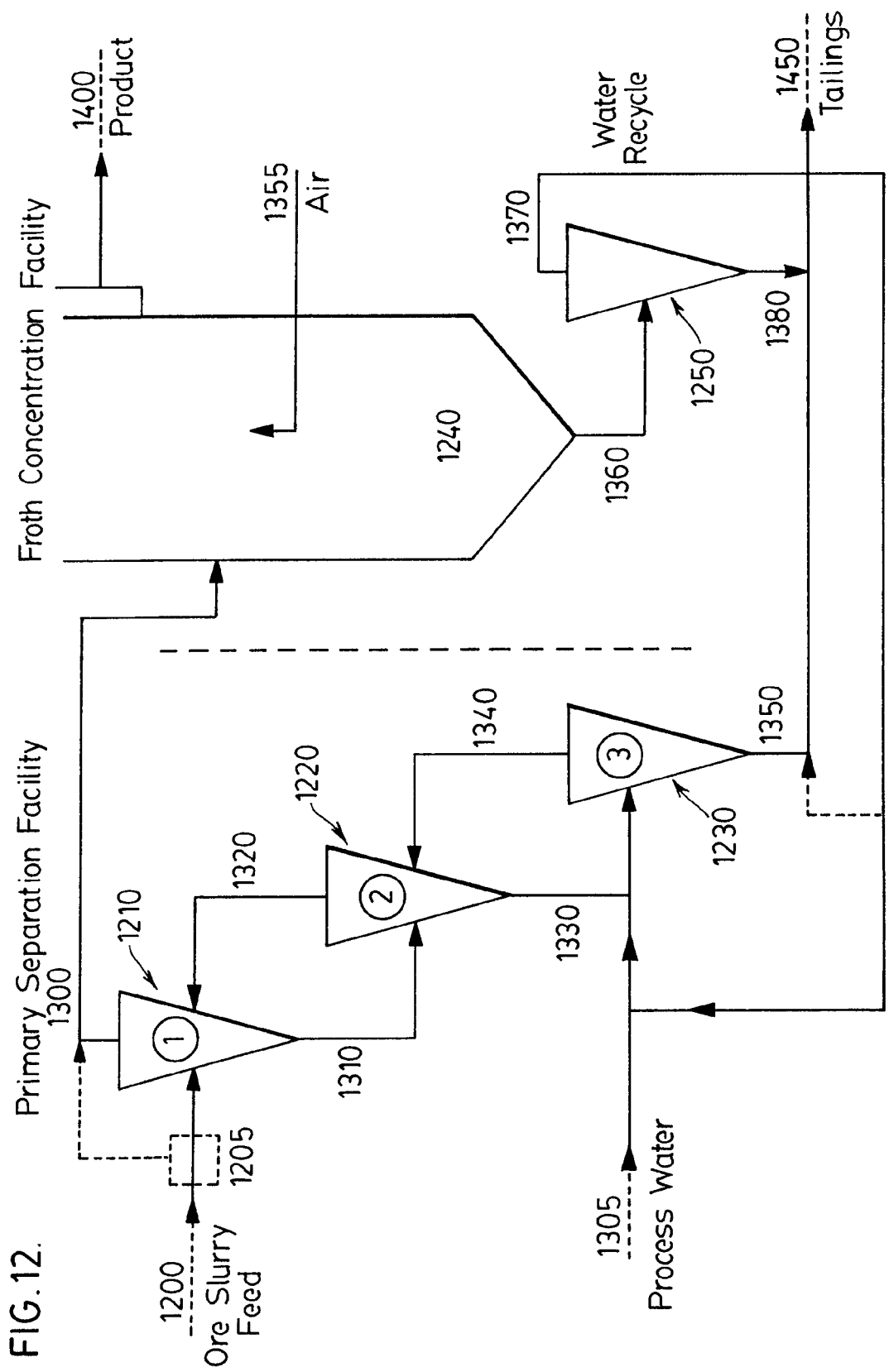
FIG. 12 is a process illustration of an embodiment of the present invention.

According to a preferred embodiment, the cyclone separation units 1210, 1220, 1230 are connected as illustrated in FIG. 12. The slurry is delivered by the hydro-transport pipeline 850 as an ore slurry feed 1200 to the first cyclone separation unit 1210. The first cyclone 1210 separates the ore slurry feed 1200 into a first bitumen froth stream 1300 and first tailings stream 1310. The first tailings stream 1310 is pumped to a feed stream of a second cyclone 1220. The second cyclone 1220 produces a second bitumen froth stream 1320 and a second tailings stream 1330. The second bitumen froth stream 1320 is combined with the ore slurry feed 1200 as the feed stream of the first cyclone 1210. The second tailings stream 1330 is combined with a water feed 1305 as the feed stream of a third cyclone 1230. The third cyclone 1230 produces a third bitumen froth stream 1340 and a third tailings stream 1350. The third bitumen froth stream 1340 is combined with the first tailings stream 1310 as the feed stream of the second cyclone 1220. The third tailings stream 1350 from the third cyclone 1230 forms a tailings stream 1400 that is pumped to a tailings treatment facility 1100.

Optionally a "scalping" unit 1205, such as a pump box or the like, may be included on the ore slurry feed 1200 to remove any froth formed in the slurry feed 1200 during the hydro-transport process and divert the bitumen froth directly to be combined with the first bitumen froth stream 1300. Removal of the bitumen rich froth at the scalping unit 1205 assists in further increasing the recovery efficiency of the primary separation facility. Preferably, as indicated, the scalping unit 1205 is located upstream of the infeed of the second bitumen froth stream 1320.

The first bitumen froth stream 1300 is directed to a froth concentration facility to reduce the water content, remove remaining fines, and produce an enriched bitumen product stream 1400. Preferably, the froth concentration facility is located proximate to the primary separation facility. Most preferably, the froth concentration facility comprises a separate portable unit that may be combined with the primary separation facility units to comprise the mobile extraction facility 900. Typically the froth concentration facility comprises at least a froth concentration vessel 1240, such as a flotation column, a horizontal decanter, an inclined plate separator, or other similar device or system known to be effective at concentrating bitumen froth. In addition to the first bitumen froth feed, an air feed 1355 or chemical additive stream may also be introduced into the froth concentration vessel 1240. Optionally the froth concentration facility may comprise a combination of effective devices. In a preferred embodiment, as illustrated in FIG. 12, the froth concentration vessel 1240 comprises a flotation column. In a further preferred embodiment for a mobile extraction facility a horizontal decanter is used to separate an enriched bitumen stream from the first bitumen froth stream. The selection of a series of countercurrent cyclone separators results in a compact separation facility that remains able to remove the majority of the mineral component from the ore slurry feed 1200. The low solids content of the first bitumen froth stream permits the use of a horizontal decanter as the froth concentration vessel with a low risk of plugging due to sedimentation. Use of a horizontal decanter is desirable due to its small footprint, thus allowing for the potential of the vessel being made movable, and still result in a robust extraction facility that has a low propensity of being fouled with silt or other mineral component.

Within the froth concentration vessel 1240, the froth is concentrated resulting in an enriched bitumen froth product stream 1400, that may optionally be transported to a secondary separation facility (not shown) to increase the hydrocarbon concentration in the froth before being pumped to an upgrader facility. Typically, the secondary separation facility will be a larger, more permanent facility. One advantage of the process of the present invention is that an enriched bitumen froth stream 1400 is produced relatively close to the excavation site, greatly reducing the current requirement to transport large volumes of water and mineral component to the permanent separation facility.

Froth concentration vessel 1240 also produces a fine tailings stream 1360 that comprises water and fine solids contained in the first bitumen froth stream 1300. In one embodiment, any known chemical additives may also be used in the froth concentration facility to enhance the separation of fines from the water.

Preferably the fine tailings stream 1360 is diverted to a water recovery unit 1250, which separates the fine tailings stream 1360 into a recycled water stream 1370 and a fine tailings stream 1380. In a preferred embodiment, the water recovery unit 1250 is a hydrocyclone to separate small sized particulate since the majority of the mineral component is removed by the primary separation facility. The fine tailings stream 1380 is preferably combined with the third tailings stream 1350 to produce a tailings stream 1450 from the mobile extraction facility 900. The recycled water stream 1370 is preferably combined with the water feed 1305 for input to the third cyclone. As necessary, the recycled water stream 1370 may also be combined with the third tailings stream 1350, fine tailings stream 1380 or tailings stream 1450 as necessary to control the water content of the streams. Preferably density meters (not shown) monitor the streams to determine whether, and how much, recycled water 1370 should be added. The addition of water to the third tailings stream 1350 and tailings stream 1450 may be necessary to maintain a pumpable stream, as the primary separation facility removes most of the water from the third tailings stream 1350 and fine tailings stream 1380. The water recovery unit 1250 provides significant efficiencies in that the process water used in the mobile extraction facility 900 is preferably heated. The recycled water stream 1370 is typically warm or hot, so that reintroducing the recycled water stream 1370 reduces the heat lost in the extraction process.

An advantage of this preferred embodiment of the present invention is that water may be recycled in the extraction process, and the mobile extraction facility 900 produces a single tailings stream 1450.

In a further optional embodiment, the ore slurry feed 1200 may be provided with any number of known additives such as frothing agents and the like prior to being fed to the primary separation facility to prepare the ore slurry feed 1200 for extraction. An example of such additives would be caustic soda, geosol, or other additives as described in U.S. Pat. No. 5,316,664.

As mentioned above, the tailings stream 1450 is pumped to a tailings treatment facility 1100. The tailings treatment facility 1100 may be located at the mobile extraction facility 900, or some distance from the mobile extraction facility 900 depending upon the availability of a tailings deposition site 1150. As will be appreciated, the location of the tailings deposition site 1150 is preferably close to the mobile extraction facility 900 to minimize the distance the tailings stream 1450 must be transported. However, the tailings treatment facility 1100 may be located distant from the mobile extraction facility 900 if it is necessary to locate the tailings deposition site 1150 at a distant location.

While the tailings treatment facility 1100 may comprise a known method or process of handling tailings, preferably tailings treatment facility 1100 comprises the addition of a rheology modifier or other such additive to the tailings stream 1450 prior to deposition at the tailings deposition site. An example of a suitable additive is described in PCT Publication No. WO/2004/060819 to Ciba Specialty Chemicals Water Treatment Limited.

In a further preferred embodiment, the third tailings stream 1350 and fine tailings stream 1380 are mixed to ensure a homogenous distribution of coarse and fine particulate in the tailings stream 1450. A preferred additive is a rheology modifier additive such as a water soluble polymer that may be added and mixed with the tailings stream 1450 to produce a treated tailings stream. The additive may be mixed into the tailings stream 1450 either during a pumping stage, or subsequently added in liquid form near the tailings deposition site. Preferably the treated tailings are deposited at the tailings deposition site and allowed to stand and rigidify thereby forming a stack of rigidified material. The addition of the additive results in a whole dry tails that rigidifies relatively quickly to produce a relatively homogenous tailings deposition. After application of the additive, the water separates from the mineral component free from the fines. Unlike conventional tailings ponds, after addition of the additive the treated tailings produced according to the present invention releases water that is sufficiently clear to be recycled as industrial process water almost immediately after tailings deposition. Furthermore, the recycled industrial process water is often still warm, reducing the energy required to be added to produce hot process water. The industrial process water may be recycled back into the mobile extraction facility 900, the mobile slurry facility 800 or other industrial processes as required. Furthermore, after separation of the water, the mineral component is comprised of both sand and fines, and is thus more stable than typical tailings produced by known processes. This provides the unique opportunity to reclaim the solid tailings relatively soon after excavation.

A suitable mobile slurry facility may comprise the slurry apparatus 10 illustrated in FIGS. 13 to 16 and further described in Applicant's previously co-pending application filed Nov. 9, 2006 entitled METHOD AND APPARATUS FOR CREATING A SLURRY (published as U.S. Patent Application Publication No. 2007/0119994 and now issued as U.S. Pat. No. 7,651,042), which is incorporated herein by reference, and claims priority from Canadian Patent Application No. 2,526,336.

Figure 13:
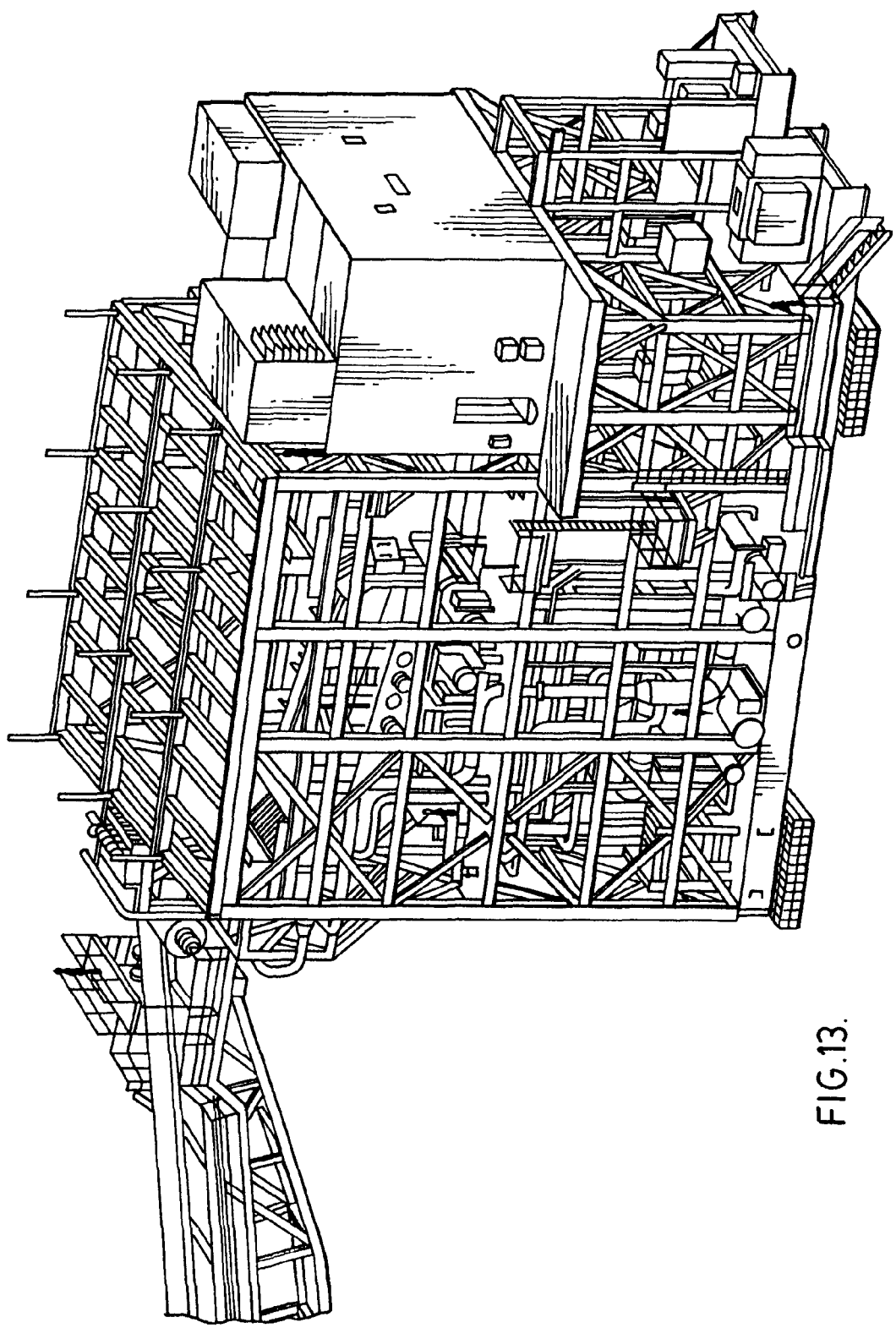
FIG. 13 is an isometric illustration of an embodiment of the present invention.

As shown in FIG. 13, the slurry apparatus 10 provides a frame 20 having a base 22. The frame 20 may optionally also be provided with sides 24. The frame 20 is preferably formed from steel girders or I-beams having the required load-bearing capacity, welded, bolted, or otherwise suitably affixed together. The frame supports a slurry box 30, which may be a conventional slurry box constructed to support the desired slurry load. The slurry box 30 essentially acts as a wet surge, maintaining the required constant supply of slurry to the slurry pump 39. The slurry box 30 provides a slurry outlet 38 which feeds the slurry pump 39, and the slurry pump 39 in turn provides a slurry outlet 41 to which a hydrotransport conduit (not shown) is detachably coupled by suitable means, for example a bolted flange.

An ore size regulating apparatus such as a screen or comminuting apparatus 50 is suspended above the slurry box 30. For example, in the preferred embodiment the comminuting apparatus may be a screening/sizing roller screen such as that described in Canadian Patent Application No. 2,476,194 entitled "SIZING ROLLER SCREEN ORE PROCESSING" published Jan. 30, 2006, which is incorporated herein by reference, which both screens and crushes ore. In the preferred embodiment the comminuting apparatus 50 is supported on the frame 20 of the slurry apparatus 10, with the output face of the comminuting apparatus 50 in communication with the open top of the slurry box 30 such that comminuted ore fed to the comminuting apparatus 50 is directed into the slurry box 30 under the force of gravity. Alternatively, as screen may be provided to screen the incoming ore flow as an initial step before crushing.

Because the slurry apparatus 10 according to the invention is movable, it is advantageous to maintain a low centre of gravity in the slurry apparatus 10 and therefore if the comminuting apparatus 50 is suspended above the slurry box 30 it is advantageous to provide the comminuting apparatus 50 as close as possible (vertically) to the open top of the slurry box 30. The comminuting apparatus 50 may be oriented close to the horizontal, or alternatively may have either a positive or negative angle to the horizontal. In a preferred embodiment the comminuting apparatus 50 is oriented at an angle to the horizontal such that comminuted ore is fed at the higher end of the comminuting apparatus 50. The comminuting apparatus 50 may be supported on its own separate frame, may be solely supported by a side 24 of the slurry apparatus frame 20, or may be supported on the slurry box 30. Alternatively, the comminuting apparatus 50 may be in communication with the slurry box 30 via one or more interposed conveyor mechanisms, such as a transfer conveyor (not shown).

The comminuting apparatus 50 may alternatively be housed in a separate structure and maintained in communication with the slurry box 30 by a conveying apparatus such as a transfer conveyor (not shown). Similarly, while the illustrated embodiment shows the slurry pump 39 and electrical transformers 9 housed in the structure of the slurry facility 10, it is possible to house these components in one or more separate structures that are detachably connected to the relevant systems in the slurry facility 10 when the slurry facility 10 is in operating mode. It is advantageous to provide transformers 9 within or immediately adjacent to the slurry facility 10, which will gradually be moved away from any permanent transformer substation as mining progresses.

A water supply 60, for example a hood with a spray header (shown in FIG. 14), is positioned to apply hot process water to the ore as it is fed into the comminuting apparatus 50, assisting in the comminuting process and so that ore is already wetted when it enters slurry box 30. As is well known in the art, the hot process water is mixed with the ore in a proportion which provides the desired slurry consistency for conditioning during transport to an extraction facility. The water supply 60 may be provided in any convenient location for dispensing the process water over the ore, preferably before comminution or optionally after comminution.

Figure 14:
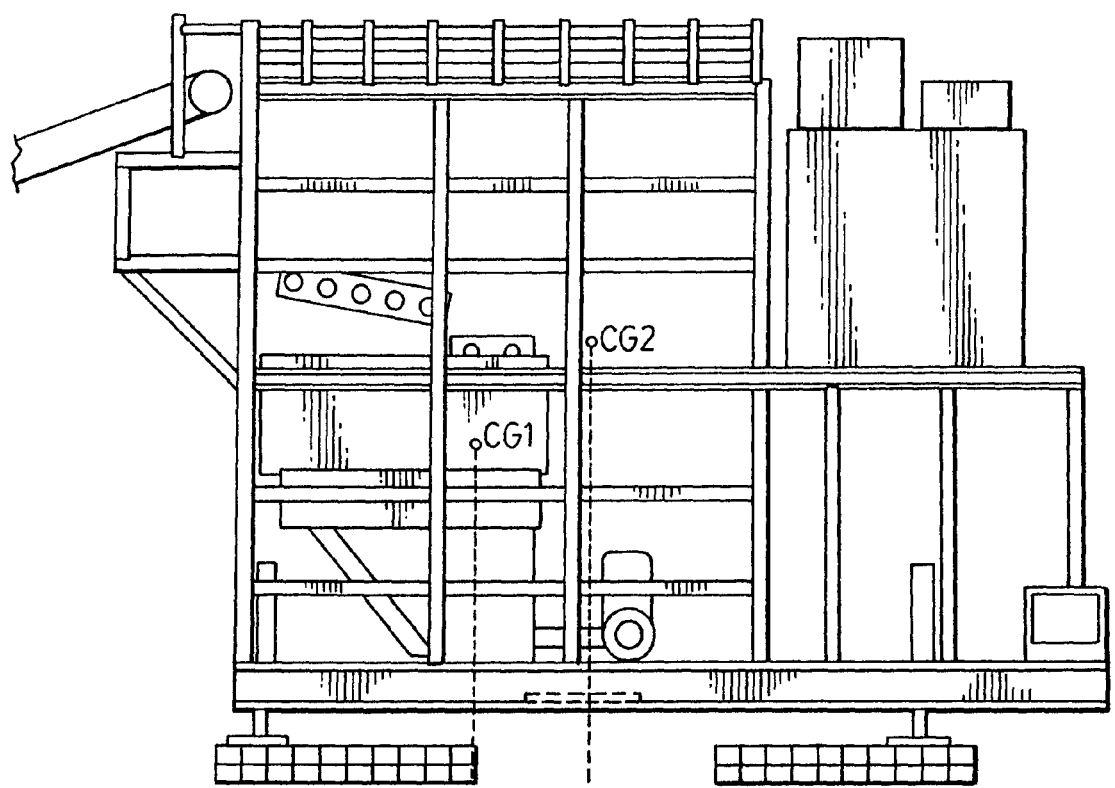
FIG. 14 is a side view illustration of an embodiment of the present invention.
Figure 15:
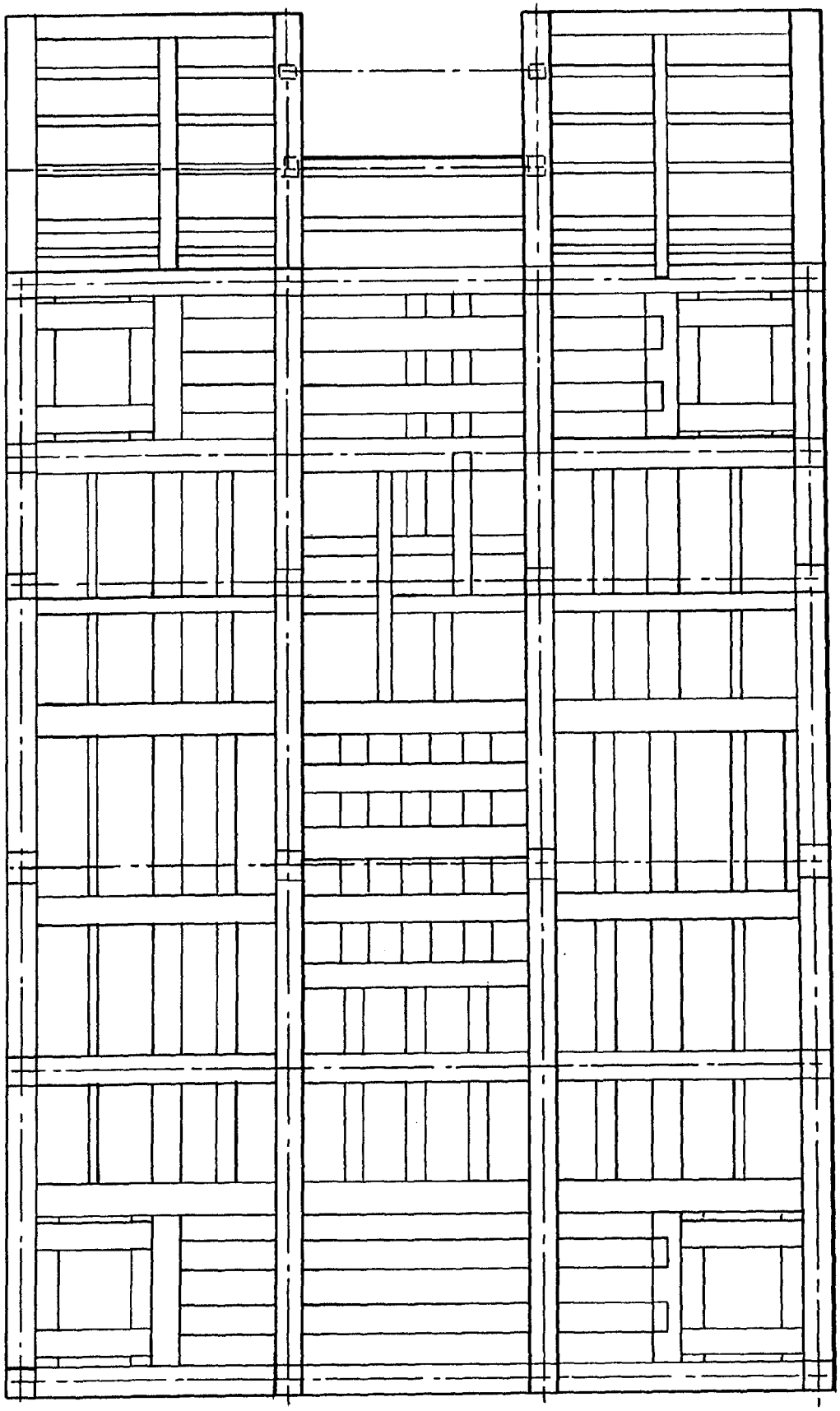
FIG. 15 is a bottom view illustration of an embodiment of the present invention.

The slurry box 30 is mounted to the floor 22 of the slurry apparatus frame 20 in the desired position. As illustrated in FIG. 14, the frame 20 is supported on a first set of spaced apart support points 21, for example adjacent to the corners where the sides 24 meet the base 22, which may be mounted on crane mats 23 as in the embodiment illustrated in FIGS. 13 and 14, to support the frame 20 in stationary mode, or alternatively may be mounted on pontoons 27 or other suitable support. The slurry box 30 may be disposed anywhere within the frame 20, as long as the centre of gravity CG1 of the slurry apparatus 10 when the slurry box 30 is filled is within the area bounded by the first set of spaced apart support points 21 (as shown in FIG. 14).

The frame 20 further contains other apparatus incidental to the operation of the slurry facility, which may for example include a gland water supply for the slurry pump 39, cooling units for conditioning the air within the facility to make it suitable for workers, electrical transformers for powering the equipment used in the slurry facility 10, safety equipment, overhead cranes for maintenance and so on. The distribution of equipment about the frame 20 of the slurry apparatus 10 determines a first center of gravity CG1 for the slurry apparatus 10 in a stationary mode, in which the slurry box 30 is filled and operational. Preferably the amount and size of equipment are minimized to keep the weight of the facility 10 as low as possible; for example, the facility 10 may house a single hydrotransport pump 39 (or the hydrotransport pump 39 may be supported on a separate structure as noted above). The heaviest equipment should be as low as possible within the frame 20, to keep the centre of gravity CG1 and CG2 low. In the stationary mode, when the frame 20 is supported on the first set of spaced apart support points 21 and the slurry box 30 is filled with slurry and operational, a considerable additional amount of weight is concentrated in the region of the slurry box 30, which determines the position of the first center of gravity CG1. The frame 20 thus supports all the on-board equipment, plus the weight of the slurry, on the first set of spaced apart support points 21.

In a moving mode, with the slurry box 30 empty, the centre of gravity is disposed at CG2. The base 22 of the frame 20 is provided with a lifting region 70, shown in FIG. 15, which is formed by a series of beams affixed to the main girders 28 of the base 22. The entire slurry apparatus 10 can thus be lifted by a single moving device such as a mobile crawler 80, for example that produced by Lampson International LLC (hereinafter referred to as a "Lampson Crawler"), lifting solely at the lifting region 70, without substantial deformation of the frame 20. The lifting region 70 defines a second set of spaced apart support points 72, which is directly beneath (and preferably centered under) the second center of gravity CG2. The Lampson Crawler, which is essentially a hydraulic lifting platform having a propulsion system and mounted on tracks as illustrated in FIG. 9B, can be positioned under the lifting region 70 using locator tabs 74, shown in FIG. 15, and raised to lift the frame 20 while maintaining the stability of the facility 10.

In the operating mode, ore is fed to the comminuting apparatus 50 in any desired fashion, for example via a transfer conveyor 6 as shown in FIGS. 13 and 4. Preferably the transfer conveyor 6 is freestanding and not connected to the slurry apparatus 10, but suspended in communication with the slurry apparatus 10. The ore is processed by the comminuting apparatus 50, preferably to reduce the particle size of the entire inflow of ore to a maximum of 2" to 2½" (although larger ore sizes can also be processed). The comminuting apparatus 50 may include an oversize comminuting component 52 (shown in FIG. 14) to comminute oversized ore and eliminate rejected ore.

The comminuted ore is mixed with water from the water supply 60 and fed into the slurry box 30. A slurry of the consistency desired for hydrotransport is thus created within the slurry box 30. The slurry progresses through the slurry box 30 over the selected retention interval and egresses through the slurry outlet to a hydrotransport pump 39, which in turn feeds the slurry into a hydrotransport outlet 41 to which a line (not shown) is detachably connected for transport to an extraction facility (not shown). The hydrotransport line is detachable from the hydro transport outlet 41 to allow for periodic movement of the slurry apparatus 10 to a new site as the mine face moves away from the slurry apparatus 10. The electrical supplies including all power lines (and optionally telecommunications cables) are preferably contained in a power cable that detachably connects to a local connection (not shown) on the slurry facility 10, which may for example be adjacent to the transformers 9, to facilitate easy connection and disconnection of all electrical systems to a standard power source remote to the movable facility 10. Preferably the electrical power system is grounded via cable to a local transformer station or platform, rather than directly into the ground, either via the power cable or via a separate grounding cable, to facilitate detachment and reattachment of the ground connection during the relocation procedure. Similarly, water supplies and connections to fluid outlets (for example emergency pond outlet 45) are not welded but are instead detachably coupled via bolted flanges, quick-connect couplings or other suitable detachable connections as desired to facilitate detachment and reattachment during the relocation procedure.

When it is desired to move the slurry apparatus 10 to a new location, the transfer conveyor 6 is deactivated to discontinue the ore flow, and the slurry box 30 is empty and flushed. Preferably the slurry apparatus 10 includes a cold water supply 43 for use in flushing the slurry apparatus (and in case of emergency; an emergency outlet 45 is also preferably provided for directing contaminated water to a nearby emergency pond if needed). When the slurry box 30 has been completely emptied and flushed, the hydrotransport line (not shown) is disconnected from hydrotransport pump 39.

All electrical and water supplies are disconnected from the apparatus 10. Once all water supplies and electrical supplies have been disconnected, the slurry apparatus 10 is ready to be moved to a new location.

Figure 16:
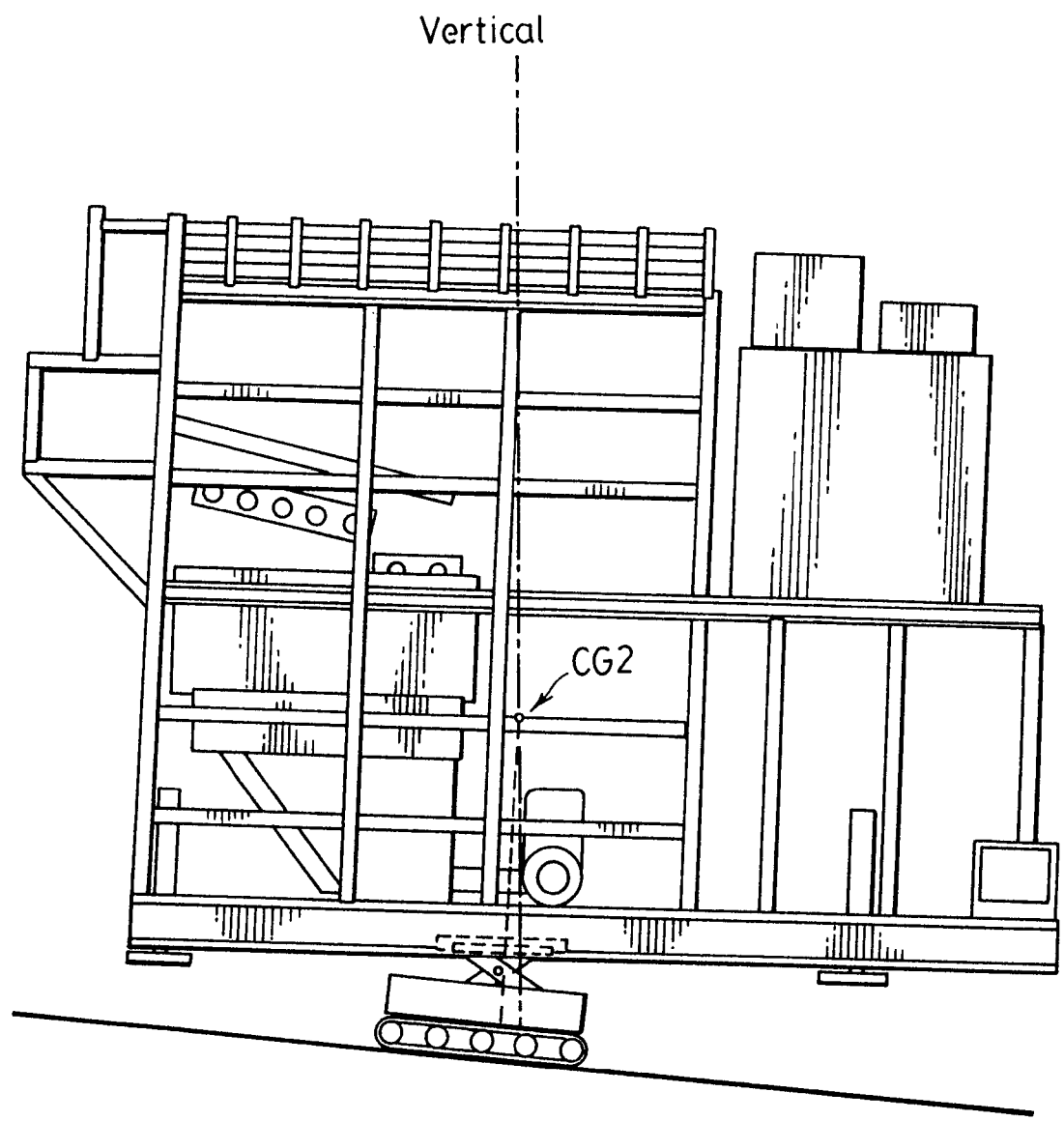
FIG. 16 is a side view illustration of an embodiment of the present invention.

A path to the new location is prepared, for example by compacting and laying down a suitable bed of gravel, if necessary. The new location is surveyed to ensure it is level (using gravel if necessary to level the site), and in the embodiment illustrated in FIGS. 13 and 14 crane mats are laid optionally covered by metal sheeting (not shown) to avoid point-loading the crane mats 23. In this embodiment hydraulic jacks 29 are provided generally under the first set of spaced apart support points, supported on the crane mats 23. The jacks 29 are actuated, either in unison or individually in increments, to raise the frame 20 to a height that will allow a moving device 80 such as a Lampson Crawler, with its hydraulic platform 82 in retracted mode, to be driven beneath the base 22 of the frame 20 and positioned under the lifting region 70 using locator tabs 74 (shown in FIG. 15) as a guide to position the hydraulic platform 82. The hydraulic platform 82 is raised, lifting the entire frame 20. When the frame 20 has been raised to support the frame the hydraulic jacks 29 are retracted (as shown in FIG. 16), the propulsion system in the Lampson Crawler 80 is engaged and the slurry apparatus 10 is moved toward the new location. Preferably the slurry apparatus 10 comprises on-board levels (not shown) at locations visible from the exterior of the apparatus 10, and/or a water level comprising a flexible tube filled with water and extending across the entire frame 20 (not shown), which are carefully monitored by operators to ensure that the facility 10 remains level within the tolerances permitted by the second set of spaced apart support points 72 (as described below).

As illustrated in FIG. 16 the slurry apparatus 10 may be tilted, preferably up to or potentially more than 8° from the vertical, while maintaining the center of gravity in moving mode CG2 over the lifting region 70. This allows the slurry apparatus 10 to be moved up or down a grade, and to tolerate variations of the ground surface. The hydraulic lifting platform 82 on the Lampson Crawler also has the ability to lift differentially, and thus compensate to some extent for the angle of a grade as shown in FIG. 16. However, the slurry apparatus 10 itself may be tilted up to the point where the center of gravity CG2 reaches the periphery of the lifting region 70, beyond which the apparatus 10 will become unstable.

When the new site is reached the hydraulic jacks 29 are extended to support the frame on the crane mats 23 which have been placed on the ground beneath the first set of support points 21, the hydraulic lifting platform 82 is lowered and the Lampson Crawler is driven away from the site. The slurry facility 10 is fully supported by the first set of spaced apart support points 21, and can be returned to the operating mode by extending (from the previous site) and reconnecting the hydrotransport line and all electrical and water supplies. An ore feeder such as a transfer conveyor is positioned in communication with the comminuting apparatus 50, and operation of the slurry facility 10 is resumed. When the slurry box 30 is once again filled with slurry, the center of gravity will shift from CG2 back to CG1, shown in FIG. 14.

In a further embodiment of the apparatus, the frame 20 is provided with pontoons 27 onto which the frame 20 is set instead of crane mats 23. This reduces the steps required to both lift the slurry apparatus 10 and to prepare the new relocation site. This also has the advantage of adding weight to the bottom of the frame 20, lowering the centres of gravity CG1 and CG2. The operation of this embodiment is otherwise as previously described.

A suitable system, apparatus and process for extraction is described and claimed in Applicant's co-pending application filed Nov. 9, 2006 entitled SYSTEM, APPARATUS AND PROCESS FOR EXTRACTION OF BITUMEN FROM OIL SANDS, (published as U.S. Patent Application Publication No. 2007/0187321), which is incorporated herein by reference, and claims priority from Canadian Patent Application No. 2,526,336.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A process line apparatus for mining an oil sands ore body, the process line apparatus comprising:
   an excavator for mining oil sands ore from the oil sands ore body;
   a mobile slurry facility located in a slurry facility position with respect to the oil sands ore body;
   a comminutor for receiving mined ore from the excavator and comminuting the mined ore to conveyable size; and
   a mobile conveyor having a free end, a discharge end and at least one drive for advancing the conveyor through an operational arc generally about the discharge end, the mobile conveyor having at least one conveyor belt for receiving comminuted ore from the comminutor, conveying the comminuted ore to the discharge end, and discharging the comminuted ore from the discharge end to a discharge point at a location proximate the discharge end, the discharge end including a location sensor operably configured to sense a discharge target and to provide feedback for locating the discharge point with respect to the discharge target to facilitate the discharge end being located to transfer the comminuted ore to the mobile slurry facility;

whereby the excavator mines a section of ore within operational reach along the length of the mobile conveyor and supplies the mined ore to the comminutor, and the comminutor supplies conveyable ore to the mobile conveyor, and wherein the mobile conveyor is periodically moved about the discharge end to locate another portion of the ore body within operational reach of the mobile conveyor and the discharge end is periodically moved in response to the feedback from the location sensor to align the discharge point to maintain the transfer of the comminuted ore to the mobile slurry facility, until substantially all of the ore body within the operational arc has been mined while the mobile slurry facility is located in the slurry facility position.

2. The apparatus of claim 1 wherein the mobile conveyor comprises two or more conveyor sections, each of the two or more conveyor sections having at least one drive for advancing the conveyor, and at least one alignment device for detecting misalignment between at least one adjacent section and controlling the drive responsive to a detection of misalignment to align adjacent sections.

3. A method of extracting a body of oil sands ore for conveyance to a mobile slurry facility using the apparatus of claim 1, the method comprising:
locating the mobile slurry facility in a slurry facility position near a mine face of the body of oil sands ore;
positioning the mobile conveyor within operational reach of a section of the ore body and locating the discharge end of the mobile conveyor to convey mined ore to the mobile slurry facility;
extracting the section of the ore body and conveying it to the mobile slurry facility;
advancing the mobile conveyor generally about the discharge end to locate the mobile conveyor within operational reach of a further section of the ore body;
extracting the further section of the ore body and conveying it to the mobile slurry facility; and
continuing to advance the mobile conveyor and convey additional sections of the ore body to the mobile slurry facility until the ore within an arc section about the discharge end of the mobile conveyor has been extracted while the mobile slurry facility is located in the slurry facility position.

4. The process line apparatus of claim 1 wherein the mobile slurry facility is operable to convert the comminuted ore into a slurry and wherein the process line apparatus further comprises a hydro-transport pipeline for conditioning the slurry to a mobile extraction facility, the mobile extraction facility operably configured to receive the slurry and combine the slurry with water to cause the slurry to be separated into a bitumen stream and a tailings stream, and
wherein the bitumen stream is directed to a separation facility and the tailings stream is directed to a tailings treatment facility.

5. The process line apparatus of claim 4 wherein the tailings treatment facility combines the tailings stream with an additive to produce treated tailings and the treated tailings are delivered to a tailings pond.

6. The process line apparatus of claim 5 wherein recovered water from the treated tailings is collected and recycled as industrial process water.

7. The process line apparatus of claim 6 wherein the industrial process water is recycled to the mobile extraction facility.

8. The process line apparatus of claim 6 wherein the industrial process water is recycled to the mobile slurry facility.

9. A process line for excavating and processing oil sands ore near a mine face, the process line comprising:
a mobile excavator for excavating ore along the length of a mobile mining conveyor;
a mobile comminutor for receiving and comminuting the excavated ore and transferring the comminuted ore to the mobile mining conveyor;
the mobile mining conveyor conveying the comminuted ore and discharging the comminuted ore to a discharge point proximate a discharge end of the mobile mining conveyor,
the mobile mining conveyor including a location sensor for locating the discharge point of the mobile mining conveyor with respect to a transfer conveyor;
the transfer conveyor conveying the comminuted ore to a mobile slurry facility;
at the mobile slurry facility combining the comminuted ore with process water to produce a slurry and pumping and conditioning the slurry through a hydro-transport pipeline to a mobile extraction facility as a slurry feed;
at the mobile extraction facility receiving the slurry feed and directing the slurry feed and a water stream as inputs to a three stage countercurrent cyclone separator;
the cyclone separator producing a bitumen rich stream and a tailings stream;
the bitumen rich stream being directed to a froth concentration unit;
the froth concentration unit separating the bitumen rich stream into a bitumen product stream, a recycled water stream and a fine tailings stream;
the fine tailings stream being combined with the tailings stream to produce a tailings product stream;
the tailings product stream being directed to a tailings treatment facility;
the tailings treatment facility receiving the tailings product stream and combining the tailings product stream with an additive to produce a treated tailings stream;
the treated tailings stream being directed to a tailings pond;
the treated tailings stream being separated into a dry tails phase and a water phase; and
the water phase being collected at the tailings pond and recycled as industrial process water.

10. The process line of claim 9 wherein the industrial process water is recycled to the mobile extraction facility.

11. The process line of claim 9 wherein the industrial process water is recycled to the mobile slurry facility.

12. The process line of claim 9 wherein the recycled water stream is combined with the water stream as the input to the mobile extraction facility.

13. The process line of claim 9 wherein the recycled water stream is combined with the process water.

14. The method of claim 3 wherein the slurry facility position is a first slurry facility position and the extracted arc section is a first extracted arc section and further comprising relocating the mobile slurry facility to a second slurry facility position proximate a mine face located at a perimeter of the first extracted arc section and extracting ore in a second arc section while the mobile slurry facility is located in the second slurry facility position.

15. The method of claim 3 wherein positioning the mobile conveyor within operational reach of the section of the ore body comprises positioning the mobile conveyor to receive mined ore from the excavator and wherein the method further comprises comminuting the mined ore to conveyable size before transferring the comminuted ore to the mobile conveyor for transporting the comminuted ore.

16. The process line apparatus of claim 1 further comprising a transfer conveyor located proximate the discharge end of the mobile conveyor, the transfer conveyor being operably configured to receive the comminuted ore from the discharge point and to transfer the received comminuted ore to the mobile slurry facility.

17. The process line apparatus of claim 16 wherein
 (a) the transfer conveyor includes a transfer conveyor hopper and a positioning ring located around the transfer conveyor hopper; and
 (b) the location sensor comprises an optical sensor operably configured to monitor the location of the positioning ring;
 wherein the discharge end is moved in response to the feedback from the location sensor to maintain the discharge point of the comminuted ore in the transfer conveyor hopper.

18. The process line apparatus of claim 2 wherein the mobile conveyor includes a mobile hopper operably configured to traverse along the mobile conveyor and to receive the comminuted ore at a plurality of locations on at least two conveyor sections.

19. The process line apparatus of claim 18 wherein the mobile hopper is operably configured to transport at least one cable reel while traversing along the length of the mobile conveyor, the at least one cable reel being operably configured to spool out at least one power cable to at least one of the mobile excavator and comminutor.

20. The process line apparatus of claim 1 wherein the mobile slurry facility further comprises:
 a frame;
 a slurry box supported by the frame;
 a first set of spaced apart support points for supporting the frame and slurry box in a stationary mode of the mobile slurry facility in which the slurry box is filled and operational, the mobile slurry facility being configured to have a first weight distribution associated with a first center of gravity of the mobile slurry facility in the stationary mode, the first center of gravity being within an area bounded by the first set of spaced apart support points; and
 a second set of spaced apart support points defining a lifting region operably configured for engagement with a lifting platform of an external moving system in a moving mode of the mobile slurry facility in which the slurry box is empty, the mobile slurry facility being configured to have a second weight distribution associated with a second center of gravity of the mobile slurry facility in the moving mode, the second center of gravity being within an area bounded by the lifting region, the lifting region being operably configured to cooperate with the frame to bear the weight of the mobile slurry facility on the lifting platform of the external moving system without causing substantial deformation of the frame of the mobile slurry facility while the mobile slurry facility is being lifted and moved by the external moving system.

21. The process line of claim 9 wherein the froth concentration unit comprises a horizontal decanter.

22. The process line apparatus of claim 9 wherein the froth concentration unit comprises a mobile froth concentrator vessel on a movable platform.

23. The process line apparatus of claim 9 wherein the mobile slurry facility comprises:
 a frame;
 a slurry box supported by the frame;
 a first set of spaced apart support points for supporting the frame and slurry box in a stationary mode of the mobile slurry facility in which the slurry box is filled and operational, the mobile slurry facility being configured to have a first weight distribution associated with a first center of gravity of the mobile slurry facility in the stationary mode, the first center of gravity being within an area bounded by the first set of spaced apart support points; and
 a second set of spaced apart support points defining a lifting region operably configured for engagement with a lifting platform of an external moving system in a moving mode of the mobile slurry facility in which the slurry box is empty, the mobile slurry facility being configured to have a second weight distribution associated with a second center of gravity of the mobile slurry facility in the moving mode, the second center of gravity being within an area bounded by the lifting region, the lifting region being operably configured to cooperate with the frame to bear the weight of the mobile slurry facility on the lifting platform of the external moving system without causing substantial deformation of the frame of the mobile slurry facility while the mobile slurry facility is being lifted and moved by the external moving system.

* * * * *